United States Patent
Angelini et al.

(10) Patent No.: US 7,542,622 B1
(45) Date of Patent: Jun. 2, 2009

(54) SPATIO-TEMPORAL TREATMENT OF NOISY IMAGES USING BRUSHLETS

(75) Inventors: Elsa D. Angelini, Paris (FR); Andrew F. Laine, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 794 days.

(21) Appl. No.: 10/858,764

(22) Filed: Jun. 2, 2004

Related U.S. Application Data

(60) Provisional application No. 60/475,106, filed on Jun. 2, 2003.

(51) Int. Cl.
G06K 9/40 (2006.01)
(52) U.S. Cl. ..................................... 382/275
(58) Field of Classification Search ........................ None
See application file for complete search history.

(56) References Cited

U.S. PATENT DOCUMENTS

| | | | | |
|---|---|---|---|---|
| 5,109,425 | A * | 4/1992 | Lawton | 382/107 |
| 5,799,111 | A * | 8/1998 | Guissin | 382/254 |
| 6,061,100 | A * | 5/2000 | Ward et al. | 348/607 |
| 6,281,942 | B1 * | 8/2001 | Wang | 348/607 |
| 6,335,990 | B1 * | 1/2002 | Chen et al. | 382/261 |
| 6,907,143 | B2 * | 6/2005 | Ferguson | 382/261 |

OTHER PUBLICATIONS

"LV Volumn Quantification via Spatiotmporal Analysis of Real-Time 3-D Echochariography", E. Angelini, A. Laine, S. Takuma, J. Holmes and S. Homma, IEEE Trans. Medical Imaging, vol. 20, No. 6, Jun. 2001, pp. 457-469.*

Achim, Alin et al. "Novel Bayesian Multiscale Method for Speckle Removal in Medical Ultrasound Images." IEEE Transactions on Medical Imaging, 20(8):772-783. (2001).

Adam, Dan and Oleg Michailovich. "Blind Deconvolution of Ultrasound Sequences Using Nonparametric local Polynomial Estimates of the Pulse." IEEE Transactions on Biomedical Engineering, 49(2):228-131. (2002).

Amadiue, Olivier et al. "Inward and Outward Curve Evolution Using Level Set Method." Proceedings of the International Conference on Image Processing, Kobe, Japan, pp. 188-192. (1999).

(Continued)

*Primary Examiner*—Matthew C Bella
*Assistant Examiner*—Yuzhen Ge
(74) *Attorney, Agent, or Firm*—Wilmer Cutler Pickering Hale and Dorr LLP

(57) ABSTRACT

Treatment and mitigation or reduction of noise effects in noisy image data and data sets is described. Various aspects include treatment of noisy data with brushlet transforms and thresholding operations along with a favorable sequence of spatial and temporal processing and thresholding. Hard and minimax thresholding operators mitigate the noise in the image data. In medical applications this can be useful in removing noise that impairs diagnosis and treatment of patient conditions. In one application, cardiac function is better studied and understood through improved imaging of the heart and cardiac structures. In an exemplary case, a favorable sequence including spatial filtering using a brushlet filter, spatial thresholding of brushlet coefficients, then temporal filtering (first in the time domain then in the frequency domain) and thresholding of temporal coefficients yields an acceptable denoised image data set.

16 Claims, 12 Drawing Sheets

OTHER PUBLICATIONS

Amini, Amir A. et al. "Using Dynamic Programming for Solving Variational Problems in Vision." IEEE Transactions on Pattern Analysis and Machine Intelligence, 12(9):855-867. (1990).

Andrey, Phillippe and Phillippe Tarroux. "Unsupervised Segmentation of Markov Random Field Modeled Texture Images Using Selectionist Relaxation." EEE Transactions on Pattern Analysis and Machine Intelligence, 20(3):252-262. (1998).

Angelini, Elsa and Andrew Laine. "Spatio-Temporal Directional Analysis of Real-Time Three Dimensional Cardiac Ultrasound." Wavelets in Signal and Image Analysis, pp. 379-416.

Antoniadis, Anestis and Georges Oppenheim. *Wavelets and Statistics*. Springer-Verlag. (1995).

Apfel, Howard D. et al. "Quantitative three dimensional echocardiography in patients with pulmonary hypertension and compressed left ventricle: comparison with cross sectional echocardiography and magnetic resonance imaging." Heart, 76:350-354. (1996).

Ashton, Edward A. and Kevin J. Parker. "Multiple Resolution Bayesian Segmentation of Ultrasound Images." Ultrasonic Imaging, 17:291-304. (1995).

Aubert, Gilles and Laure Blanc-Feraud. "Some Remarks on the Equivalence between 2D and 3D Classical Snakes and Geodesic Active Contours." International Journal of Computer Vision, 34(1):19-28. (1999).

Aubert, Gilles and Luminita Vese. "AVariational Method in Image Recovery." SIAM J. Numer. Anal., 34(5):1948-1979. (1997).

Auscher, Pascal et al. "Local Sine and Cosine Bases of Coifman and Meyer and the Construction of Smooth Wavelets." Wavelets —A Tutorial In Theory and Applications, pp. 237-256. (1992).

Belohlavek, Marek et al. "Three- and Four Dimensional Cardiovascular Ultrasound Imaging: A New Era for Echocardiography." Mayo Clinic Proc., 68:221-240. (1993).

Belohlavek, Marek M. D. "Quantitative Three-Dimesional Echocardiography: Image Analysis for Left Ventricular Volume Assessment." Thesis Submitted to The Mayo Graduate School (Aug. 1996).

Borup, Lasse and Morten Nielsen. "Approximation with brushlet systems." Journal of Approximation Theory, 123:25-51. (2003).

Bosch, J. G. et al. "Fully Automated Endocardial Contour Detection in Time Sequences of Echocardiograms by Active Appearance Motion Models." Computers in Cardiology, 28:93-96. (2001).

Boukeroui, Djamal et al. "Segmentation of Echocardiographic Data. Multiresolution 2D and 3D Algorithm Based on Grey level Statistics." Proceedings of the MICCAI, Cambridge, UK, pp. 516-523. (1999).

Breiman, Leo. *Statistics: With a View Toward Applications*. Houghton Mifflin Company, Boston, MA. (1973).

Chalana, Vikram et al. "A Multiple Active Contour Model for Cardiac Boundary Detection on Echocardiographic Sequences." IEEE Transactions on Medical Imaging, 15(3):290-298. (1996).

Chan, M. T. et al. "Comparing Lesion Detection Performance for PET Image Reconstruction Algorithms: a Case Study." IEEE Transactions on Nuclear Science, 44(4): 1558-1563. (1997).

Chan, T. F. and L. A, Vese. "Active Contour and Segmentation Models using Geometric PDE's for Medical Imaging." Geometric Methods in Bio-Medical Image Processing, Mathematics and Visualization, pp. 63-75. (2002).

Chan, Tony F. and Luminita A. Vese. "Active Contours Without Edges." IEEE Transactions on Image Processing, 10(2):266-277. (2001).

Chang, S. Grace et al. "Spatially Adaptive Wavelet Thresholding with Context Modeling for Image Denoising." Proceedings of International Conference on Image Processing, Chicago, IL, pp. 535-539. (1998).

Chen, Chien-Chang and Daniel C. Chen. "Multi-resolutional gabor filter in texture analysis." Pattern Recognition Letters, 17:1069-1076. (1996).

Chen, Chung-Ming et al. "A Textural Approach Based on Gabor Functions for Texture Edge Detection in Ultrasound Images." Ultrasound in Med. & Biol., 27(4):515-534. (2001).

Chen, Yunmei et al. "On the Incorporation of shape priors into geometric active contours." Proceedings of the IEEE Workshop on Variational and Level Set Methods in Computer Vision, Vancouver, BC Canada, pp. 145-152. (2001).

Concotti, Gabriella et al. "Frequency Decomposition and Compounding of Ultrasound Medical Images with Wavelet Packets." IEEE Transactions on Medical Imaging, 20(8):764-771. (2001).

Cohen, Laurent D. and Isaac Cohen. "Finite-Element Methods for Active Contour Models and Balloons for 2-D and 3-D Images." IEEE Transactions on Pattern Analysis and Machine Intelligence, 15(11):1131-1147. (1993).

Cohen, Laurent, D. and Isaac Cohen. "Deformable Models for 3D Medical Images using Finite Elements & Balloons." Proceedings of IEEE Conference on Computer Vision and Pattern Recognition. (1992).

Coifman, Ronald R. and Lionel Woog. "Adapted Waveform Analysis, Wavelet-Packets and Local Cosine Libraries as a Tool for Image Processing." SPIE, 2567:31-39. (1995).

Coppini, Giuseppe et al. "Recovery of the 3-D Shape of the Left Ventricle from Echocardiographic Images." IEEE Transactions on Medical Imaging, 14(2):301-317. (1995).

Corsi, C. et al. "Left ventricular endocardial surface detection based on real-time 3D echocardiographic data." European Journal of Ultrasound, 13:41-51. (2001).

Corsi, C. et al. "Real-Time 3D Echocardiographic Data Analysis for Left Ventricular Volume Estimation." Computer in Cardiology, 27:107-110. (2000).

Crawford, D. C. et al. "Compensation for the Signal Processing Characteristics of Ultrasound B-Mode Scanners in Adaptive Speckle Reduction." Ultrasound in Med. & Biology, 19(6):469-485. (1993).

Cremers, Daniel et al. "Diffusion-Snakes: Combining Statistical Shape Knowledge and Image Information in a Variational Framework." Proceedings of the Workshop on Variational and Level Set Method in Computer Vision, Vancouver, BC, Canada, pp. 137-144. (2001).

Czerwinski, Richard N. et al. "Detection of Lines and Boundaries in Speckle Images - Application to Medical Ultrasound." IEEE Transactions on Medical Imaging, 18(2):126-136. (1999).

Czerwinski, Richard N. et al. "Ultrasound Speckle Reduction by Directional Median Filtering." Proceedings of the International Conference on Image Processing, Washington, DC, pp. 358-361. (1995).

Detmer, Paul R. et al. "Matched Filter Identification of Left-Ventricular Endocardial Borders in Transesoophageal Echocardiograms." IEEE Transactions on Medical Imaging, 9(4):396-404. (1990).

Dias, Jose M. and Jose M. N. Leitao. "Wall Position and Thickness Estimation from Sequences of Echocardiographic Images." IEEE Transactions on Medical Imaging, 15(1): 25-38. (1996).

Dong, Yunhan et al. "A Review of SAR Speckle Filters: Texture Restoration and Preservation." Proceedings of the International Symposium on Geoscience and Remote Sensing, Honolulu, HI, pp. 633-635. (2000).

Donoho, David L. "De-Noising by Soft-Thresholding." IEEE Transactions on Information Theory, 41(3):613-627. (1995).

Donoho, David L. "Nonlinear Solution of Linear Inverse Problems by Wavelet-Vaguelette Decomposition." Applied and Computational Harmonic Analysis, 2:101-126. (1995).

Donoho, David L. "Orthonormal Ridgelets and Linear Singularities." SIAM J. Math. Anal., 31(5):1062-1099. (2000).

Donoho, David L. and Iain M. Johnstone. "Ideal Spatial Adaptation by Wavelet Shrinkage." Biometrika, 81(3):425-455. (1994).

Drezek, Rebekah, et al. "Active contour based on elliptical Fourier series, applied to matrix- array ultrasound of the heart." SPIE, 2962: 26-34. (1997).

Duskunovic, Ivana et al. "Wavelet Based Denoising Techniques for Ultrasound Images." Proceedings of the 22nd Annual EMBS International Conference, Chicago, IL, pp. 2662-2665. (Jul. 23-28, 2000).

Dutt, Vinayak and James F. Greenleaf. "Adaptive Speckle Reduction Filter for Log- Compressed B-Scan Images." IEEE Transactions on Medical Imaging, 15(6):802-813. (1996).

Farquhar, T. H. et al. "An Investigation of Filter Choice for Filtered Back-Projection Reconstruction In PET." IEEE Transactions on Nuclear Science, 45(3):1133-1137. (1998).

Feng, Haihua et al. "A Curve Evolution Approach for Image Segmentation using Adaptive Flows." Proceedings of the International Conference on Computer Vision, Vancouver, BC, Canada, pp. 494-499. (2001).

Feng, Jie et al. "Epicardial Boundary Detection Using Fuzzy Reasoning." IEEE Transactions on Medical Imaging, 10(2):187-199. (1991).

Fenster, Aaron and Donal B. Downey. "3-D Ultrasound Imaging: A Review." IEEE Engineering in Medicine and Biology, pp. 41-51. (Nov./Dec. 1996).

Fenster, Aaron and Donal B. Downey. "Three-Dimensional Ultrasound Imaging." Handbook of Medical Imaging, vol. I, Physics and Psychophysics, vol. I, The International Society of Optical Engineering, pp. 463-509. (2000).

Fenster, Aaron et al. "Three-dimensional ultrasound imaging." Phys. Med. Biol., 46:R67-R99. (2001).

Fleishman, Craig E. et al. "Real-Time Three-Dimensional Echocardiography: Measurement of Left Ventricular Mass in Dogs." Circulation, 94(8):4019. (1996).

Friedland, N. and D. Adam. "Automatic Ventricular Cavity Boundary Detection from Sequential Ultrasound Images Using Simulated Annealing." IEEE Transactions on Medical Imaging, 8(4):344-353. (1989).

Frost, Victor S. et al. "A Model for Radar Images and its Application to Adaptive Digital Filtering of Multiplicative Noise." IEEE Transactions on Pattern Analysis and Machine Intelligence, PAMI-4(2):157-166. (1982).

Gagon, Langis. "Wavelet Filtering of Speckle Noise - Some Numercial Results." Proceedings of the Conference Vision Interface. (1999).

Georgiou, Georgia and Gernand S. Cohen. "Statistical Characterization of Diffuse Scattering in Ultrasound Images." IEEE Transactions on Ultrasonic, Ferroelectrics, and Frequency Control, 45(1):57-64. (1998).

Germain, Christian et al. "Multiscale Estimation of Textural Features. Application to the Characterization of Texture Anisotropy." Proceedings of the 15th International Conference on Pattern Recognition, pp. 923-926. (2000).

Gersony, Deborah R. et al. "Spatio-Temporal Brushlet Denoising Improves Real Time Three- Dimensional Calculation of Right Ventricular Function in Primary Pulmonary Hypertension Patients." Proceedings of the Scientific Session of the American College of Cardiology Atlanta, GA. (2002). - Abstract.

Goodman, J. W. "Statistical Properties of Laser Speckle Patterns." Laser Speckle and Related Phenomena. Heidelberg: Springer-Verlag, pp. 9-75. (1975).

Hao, Xiaohui et al. "A Combination Method for Ultrasonic Speckle Suppression." Proceedings of the 20th Annual international Conference of the IEEE Engineering in Medicine and Biology Society, 20(2):854-856. (1998).

Hao, Xiaohui et al. "A Novel Multiscale Nonlinear Thresholding Method for Ultrasonic Speckle Suppressing." IEEE Transactions on Medical Imaging, 18(9):787-794. (1999).

Herlin, I. L. and G. Giraudon. "Performing Segmentation of Ultrasound Images using Temporal information." Proceedings of the Computer Vision and Pattern Recognition, New York, NY, pp. 373-378. (1993).

Herlin, I. L. et al. "Segmentation of echocardiographic images with Markov random fields." Proceedings of the European Conference on Computer Vision, pp. 201-206. (1994).

Hokland, Jorn H. and Patrick A. Kelly. "Markov Models of Specular and Diffuse Scattering in Restoration on Medical Ultrasound Images." IEEE Transactions on Ultrasonics, Ferroelectrics, and Frequency Control, 43(4):660-669. (1996).

Hudson, H. Malcolm and Richard S. Larkin. "Accelerated Image Reconstruction Using Ordered Subsets of Projection Data." IEEE Transactions on Medical Imaging, 13(4):601-609. (1994).

Hunter, I. A. et al. "Fully Automatic Left Ventricular Boundary Extraction in Echocardiographic Images." Computers In Cardiology, pp. 741-744. (1995).

Inerfield, Michael et al. "A Sigma-Delta-Based Sparse Synthetic Aperture beamformer for Real-Time 3-D Ultrasound." IEEE Transactions on Ultrasonics, Ferroelectrics, and Frequency Control, 49(2):243-254. (2002).

Jain, Anil K. et al. "Deformable Template Models: A Review." Signal Processing, 71:109-129. (1998).

Jang, Heung Soon et al. "Ultrasound Attenuation Estimation Using the LMSE Filters and the Median Filter." Ultrasound in Med. & Biol., 14(1):51-58. (1988).

Jones, Timothy N. and Dimitris N. Metaxas. "Automated 3D Segmentation Using Deformable Models and Fuzzy Affinity." Proceedings of the 15th International Conference, Information Processing in Medical Imaging, Vermont, USA, pp. 113-126. (1997).

Kao, Chien-Min et al. "A Bayesian Approach for Edge Detection in Medical Ultrasound Images." IEEE Transactions on Nuclear Science, 45(6):3089-3096. (1998).

Kass, Michael et al. "Snakes: Active Contour Models." International Journal of Computer Vision, pp. 321-331. (1988).

Kimmel, R. et al. "Images as Embedded maps and Minimal Surfaces: Movies, Color, Texture, and Volumetric Medical Imaging." International Journal of Computer Vision, 39(2):111-129. (2000).

Kisilev, Pavel et al. "Wavelet Domain ML Reconstruction in Positive Emission Tomography." Proceedings of the 22nd Annual EMBS International Conference, Chicago, IL, pp. 90-93. (Jul. 2000).

Kisslo, Joseph et al. "Real-Time Volumetric Echocardiography: The Technology and the Possibilities." Echocardiography: A Journal of CV Ultrasound & Allied Tech., 17:773-779. (2000).

Klingler, Joseph W. et al. "Segmentation of Echocardiographic Images Using Mathematical Morphology." IEEE Transactions on Biomedical Engineering, 35(11):925-934. (1988).

Kofidis, Eleftherios et al. "Nonlinear adaptive filters for speckle supperssion in ultrasonic images." Signal Processing, 52:357-372. (1996).

Kotropoulos, C. et al. "Nonlinear Ultrasonic Image Processing Based on Signal-Adaptive Filters and Self-Organizing Neural Networks." IEEE Transactions on Image Proceesing, 3(1):65-77. (1994).

Kuan, Darwin T. et al. "Adaptive Restoration of Images with Speckle." IEEE Transactions on Acoustics, Speech, and Signal Processing, ASSP-35(3):373-383. (1987).

Laine, Andrew and Jian Fan. "Texture Classification by Wavelet Packet Signature." IEEE Transactions on Pattern Analysis and Machine Intelligence, 15(11):1186-1191. (1993).

Laine, Andrew F. "Wavelets in Temporal and Spatial Processing of Biomedical Images." Annu. Rev. Biomed.Eng., 02:511-550. (2000).

Lee, Doyal et al. "Real-Time 3-Dimensional Echocardiographic Evaluation of Left Ventricular Volume: Correlation with Magnetic Resonance Imaging - A Validation Study." J. Am. Soc. Echocardiogr., 14:1001-1009. (2001).

Lee, Jong-Sen. "Digital Image Enhancement and Noise Filtering by Use of Local Statistics." IEEE Transactions on Pattern Analysis and Machine Intelligence, PAMI-2(2):165-168. (1980).

Leymarie, Frederic and Martin D. Levine. "Tracking Deformable Objects in the Plans Using an Active Control Contour Model." IEEE Transactions on Pattern Analysis and Machine Intelligence, 15(6):617-634. (1993).

Lin, Jou-Wei et al. "Improving PET-Based Physiological Quantification Through Methods of Wavelet Denoising." IEEE Transactions on Biomedical Engineering, 48(2):202-212. (2001).

Loncaric, Sven et al. "3-D deformable model for aortic aneurysm segmentation from CT images." Proceedings of the International Conferece of the IEEE Engineering in Medicine and Biology Society, Chicago, IL, pp, 398-401. (2000).

Lotjonen, Jrkl et al. "Segmentation of Magnetic Resonance Images Using 3D Deformable Models." Proceedings of the Medical Image Computing and Computer-Assisted Intervention, Boston, MA, pp. 1213-1221.

Loupas, T et al. "An Adaptive Weighted Median Filter for Speckle Suppression in Medical Ultrasonic Images." IEEE Transactions on Circuits and Systems, 36(1):129-135. (1989).

Loupas, T. et al. "Deconvolution in medical ultrasonics: practical considerations." Phys, Med. Biol., 34(11):1691-1700. (1989).

Mair, B. A. et al. "Filter Banks and the EM Algorithm." Proceedings of Nuclear Science Symposium, pp. 1747-1751. (1996).

Malassiotis, Sotiris and Michael Gerassimos Strintzis. "Tracking the left Ventricle in Echocardiographic Images by Learning Heart Dynamics." IEEE Transactions on Medical Imaging, 18(3):282-290. (1999).

Malladi, R, and J. A. Senthian. "Level Set and Fast Marching Methods in Image Processing and Computer Vision." Proceedings of the IEEE International Conference on Image Processing, Lausanne, Switzerland, pp. 489-492. (1996).

Malladi, R. et al. "A Geometric Approach to Segmentation and Analysis of 3D Medical Images." Proceedings of MMBIA, pp. 244-252. (1996).

Malladi, Ravikanth et al. "Shape Modeling with Front Propagation: A Level set Approach." IEEE Transactions on Pattern Analysis and Machine Intelligence, 17(2):158-175. (1995).

Mallat, Stephane G. "A Theory for Multiresolution Signal Decomposition: The Wavelet Representation." IEEE Transactions on Pattern Analysis and Machine Intelligence, 11(7):674-693. (1989).

Mallat, Stephane. "A Wavelet Tour of Signal Processing." Academic Press. (1998).

Malvar, Henrique S. "Lapped Transforms for Efficient Transform/Subband Coding." IEEE Transactions on Acoustics, Speech, and Signal Processing, 38(6):969-978. (1990).

McInerney, Tim and Demetri Terzopoulos. "Deformable Models in Medical Image Analysis: A Survey." Medical Image Analysis, 1(2):91-108. (1996).

McLachian, Geoffrey J. and Thriyambakam Krishnan. "The EM Algorithm and Extensions." John Wiley & Sons, Inc. (1997).

Medeiros, Fatima N. S. et al. "Adaptive Speckle MAP Filtering for SAR Images Using Statistical Clustering." Proceedings of the International Symposium on Computer Graphics, Image Processing, and Vision, Rio de Janeiro, Brazil, pp. 303-310.(1998).

Metaxas, Dimitris N. Physics-Based Deformable Models. Kluwer Academic Publishers. (1997).

Meyer, Francois G. and Ronald R. Coifman. "Brushlets: A Tool for Directional Image Analysis and Image Compression." Applied and Computational Harmonic Analysis, 4:147-187. (1997).

Mikic, I vana et al. "Segmentation and Tracking in Echocardiographic Sequences: Active Contours Guided by Optical Flow Estimates." IEEE Transactions on Medical Imaging, 17(2):274-284. (1998).

Miyata, Shigeharu and Mitsuo Ohta. "A Consideration on Generalized Rician Distribution Expression for the Speckle Pattern on the Ultrasound B-Scan and Its Experimental Confirmation." Proccedings of the Industrial Electronics, Contri and Instrumentation, Kobe, Japan, pp. 2125-2130. (1991).

Mojsilovic, Aleksandra et al. "Wavelet Image Extension for Analysis and Classification of infarcted Myocardial Tissue." IEEE Transactions on Biomedical Engineering, 44(9):856-866. (1997).

Molthen, R. C. et al. "Ultrasound Echo Evaluation by K-Distribution." Ultrasonics Symposium, pp. 957-960. (1993).

Mondelli, John A. et al. "The Validation of Volumetric Real-Time 3-Dimensional Echocardiography for the Determination of left Ventricular Function." J. Am. Soc. Echocardiogr., 14:994-1000. (2001).

Montagnat, J. et al. "A review of deformable surfaces: topology, geometry and deformation." Image and Vision Computing, 19:1023-1040. (2001).

Montagnat, J. et al. "Cylindrical Echocardiographic Image Segmentation Based on 3D Deformable Models." Proceedings of the Medical Imaging and Computer-Assisted Intervention, Cambridge, England, pp. 168-175. (1999).

Montagnat, J. et al. "Surface Simplex Meshes for 3D Medical Image Segmentation." Proceedings of the 2000 IEEE International Conference on Robotics & Automation, San Francisco, CA, pp. 864-870. (2000).

Montagnat, Johan et al. "Representation, shape, topology and evolution of deformable surfaces. Application to 3-D medical image segmentation." INRIA, Soophia Antipolis, RR-3954. (2000).

Morel, Jean-Michel and Sergio Solimini. Variational Methods in Image Segmentation. Brikhauser. (1995).

Morsy, Ahmed A. et al. "Detection and quantification of true 3D motion components of the mycardium using 3D speckle tracking in volumetric ultrasound scans: simulations and initial experimental results." SPIE, 3033: 346-353. (1997).

Mulet-Parade, Miguel and J. Alison Noble. "2D+T Acoustic Boundary Detection in Echocardiography." Medical Image Analysis, 4:21-30. (2000).

Mumford, D. and J. Shah. "Boundary Detection by Minimizing Functionals, I." Proceedings of the International Conference on Computer Vision and Pattern Recognition, San Francisco, CA, pp. 22-26. (1985).

Narayanan, V. Manoj et al. "Non-Rayleigh Statistics of Ultrasonic Backscattered Signals." IEEE Transactions on Ultrasonics, Ferroelectrics, and Frequency Control, 41(6):845-852. (1994).

Neskovic, Aleksandar N. et al. "Myocardial Tissue Characterization After Acute Myocardial Infarction with Wavelet Image Decomposition: A Novel Approach for the Detection of Myocardial Viability in the Early Postinfarction Period." Circulation, 98:634-641. (1998).

Ofili, Elizabeth O. and Navin C. Nanada. "Three-Dimensional and Four-Dimensional Echocardiography." Ultrasound in Med. & Biol., 20(8):669-675. (1994).

Osher, Stanley and James A. Sethian. "Fronts Propagating with Curvature-Dependent Speed: Algorithms Based on Hamiliton-Jacobi Formulations." Journal of Computational Physics, 79:12-49. (1988).

Ota, Takahiro et al. "Real-time, three-dimensional echocardiography: Feasibility of dynamic right ventricular volume measurement with saline contrast." Am Heart J., 137:958-966. (1999).

Papademetris, Xenophon et al. "Estimation of 3D left ventricular deformation from echocardiography." Medical Image Analysis, 51:17-28. (2001).

Papadimitriou, S. et al. "Denoising of the fetal heart rate signal with non-linear filtering of the wavelet transform maxima." International Journal on Medical Informatics, 44:177-192. (1997).

Papadopoulos, Ioannis et al. "Bayesian Contour Estimation of the Left Ventricle in Ultrasound Images of the Heart." Proceedings of the International Conference of the IEEE Engineering in Medicine and Biology Society, Montreal, Canada, pp. 591-592. (1995).

Paragios, Nikos and Rachid Deriche. "Geodesic Active Contours and Level Sets for the Detection and Tracking of Moving Objects." IEEE Transactions on Pattern Analysis and Machine Intelligence, 22(3):266-280. (2000).

Pascazio, Vito and Glida Shcirinzi. "Reduction of Mupltiplicative Noise in SAR Imaging by Wiener Filtering." Proceedings of the the International Geoscience and Remote Sensing Symposium, Lincoln, NE, pp. 1577-1579. (1996).

Portilla, Javier and Eero P. Simoncelli. "A Parametric Texture Model Based on Joint Statistics of Complex Wavelet Coefficients." International Journal of Computer Vision, 40(1):49-71. (2000).

Raheja, Amar et al. "Multiresolution Expectation Maximization Reconstruction Algorithm for Positron Emission Tomography using Wavelet Processing." IEEE Transactions on Nuclear Science, 46(3):594-602. (1999).

Rakotomamonjy, Alain and Pierre Marche. "Wavelet-based enhancement of lesion detectability in ultrasound B-scan Images." Proceedings of the 20th Annual International Conference of the IEEE Engineering in Medicine and Biology Society, 20(2):808-811. (1998).

Rankin, Richard N. et al. "Three-Dimensional Sonograph Reconstruction: Techniques and Diagnostic Applications." AJR, 161:695-702. (1993).

Rudin, Leonid I. et al. "Nonlinear total variation based noise removal algorithms." Physica D., 60:259-268. (1992).

Sapia, M. A. et al. "Ultrasound Image Deconvolution Using Adaptive Inverse Filtering." Proceedings of the IEEE Symposium on Computer-Based Medical Systems, Stamford, CT, pp. 248-253. (1999).

Sarti, A. et al. "Subjective Surfaces: A Geometric Model for Boundary Completion." International Journal of Computer Vision, 46(3):201-221. (2002).

Schiller, Nelson B. et al. "Recommendations for Quantitation of the Left Ventricle by Two- Dimensional Echocardiography." Journal of the American Society of Echocardiography, 2(5):358-367. (1989).

Schmidt, Michael A. et al. "Real-Time Three-Dimensional Echocardiography for Measurement of Left Ventricular Volumes." Am. J. Cardiol, 84:1434-1439. (1999).

Setarhdan, Kamaledin S. and John J. Soraghan. "Automated Cardiac LV Boundary Detection and Tracking Using Hybrid Fuzzy Temporal and Fuzzy Multiscale Edge Detection." IEEE Transactions on Biomedical Engineering, 46(11):1364-1378. (1999).

Setarehdan, S. K. and J. J. Soranghan. "Fuzzy Multiscale Edge Detection (FMED) Applied to Automatic Left Ventricle Boundary Extraction." Image Processing andits Applications, Conference Publication No. 465. pp. 552-556. (1999).

Sethian, J. A. "Fast Marching Methods." SIAM Review, 41(2):199-235. (1999).

Sethian, J. A. Level Set Methods and Fast Marching Methods. Cambridge University Press. (1996).

Sehtian, James A. "Theory, algorithms, and applications of level set methods for propagating interfaces." Acta Numerica, pp. 309-395. (1996).

Shankar, P. M. et al. "Use of Non-Rayleigh Statistics for the Identification of Tumors in Ultrasonic B-Scans of the Breast." IEEE Transactions on Medical Imaging, 12(4):687-692. (1993).

Shankar, P. Mohana. "A General Statistical Model for Ultrasonic Backscattering from Tissues." IEEE Transactions on Ultrasonics, Ferroelectrics, and Frequency Control, 47(3):727-736. (2000).

Shattuck, David P. et al. "Explososcan: A Parallel Processing Technique for High Speed Ultrasound Imaging with Linear Phased Arrays." J. Acoust. Soc. Am., 75(4): 1273-1282. (1984).

Shepp, L. A. and Y. Vardi. "Maximum Likehood Reconstruction for Emission Tomorgraphy." IEEE Transactions on Medical Imaging, MI-1(2):113-122. (1982).

Shiota, Takahiro et al. "Real-time Three-dimensional Echocardiography for Determining Right Ventricular Stroke Volume in an Animal Model of Chronic Right Ventricular Volume Overload." Circulation, 97:1900. (1998).

Siddiqi, Kaleem et al. "Area and Length Minimizing Flows for Shape Segmentation." IEEE Transactions on Image Processing. 7(3):433-443. (1988).

Simoncelli, Eero P. and Javier Portilla. "Texture Characterization via Joint Statistics of Wavelet Coefficient Magnitudes." Proceedings of the IEEE International Conference on Image Processing, Chicago, Illinois, pp. 62-66. (1998).

Smith, S. W. et al. "Improved Real-Time Volumetric Ultrasonic Imaging." Ultrasonic Imaging, pg. 202. (1992). —Abstract.

Staib, Lawrence H. and James S. Duncan. "Left Ventricular Analysis from Cardiac Images Using Deformable Models." Proceedings of the Computers in Cardiology, Washington, DC, pp. 427-430. (1989).

Stetten, George D. et al. "Real-Time 3D Ultrasound: A New Look at the the Heart." Journal of Cardiovascular Diagnosis and Procedures, 15(2):73-84. (1998).

Storvik, Geir. "A Bayesian Approach to Dynamic Contours through Stochastic Sampling and Simulated Annealing." IEEE Transactions on Pattern Analysis and Machine Intelligence, 16(10):976-986. (1994).

Strintzis, M. G. et al. "Maximum Likelihood Signal Adaptive Filtering of Speckle in Ultrasound B-Mode Images." proceedings of the International Conference of the IEEE Engineering in Medicine and Biology Society, pp. 1870-1871. (1992).

Suri, Jasjit S. "Leaking Prevention in Fast Level Sets Using Fuzzy Models: An Application in MR Brain." Proceedings of the IEEE EMBS International Conference on Information Technology Applications in Biomedicine, Arlington, VA, pp. 220-225. (2000).

Sussman, Mark et al. "A Level Set Approach for Computing Solutions to Incompressible Two- Phase Flow." Journal of Computaional Physics, 114:146-159. (1994).

Takuma, Shin et al. "Assessment of Left Ventricular Function by Real-Time 3-Dimensional Echocardiography Compared with Conventional Noninvasive Methods." J. Am. Soc. Echocardiogr., 14:275-284. (2001).

Taxt, Torfinn and Jarie Strand. "Two-Dimensional Noise-Robust Blind Deconvolution Ultrasound Images." IEEE Transactions on Ultrasonic, Ferroelectrics, and Frequency Control, 48(4):861-866. (2001).

Taxt, Torfinn. "Three-Dimensional Blind Deconvolution of Ultrasound Images." IEEE Transactions on Ultrasonic, Ferroelectrics, and Frequency Control, 48(4):867-871. (2001).

Thomas, Judith G. et al. "Automatic Segmentation of Ultrasound Images Using Morphological Operators." IEEE Transactions on Medical Imaging, 10(2):180-186. (1991).

Trobaugh, Jason W. and R. Martin Arthur. "Representation of Shape in Ultrasonic Images with a Physically-Based Image Model." Proceedings of the IEEE Workshop on Mathematical Methods in Biomedical Image Analysis, Kauai, HI, pp. 79-86. (2001).

Tsai, Andy et al. "Curve Evolution Implementation of the Mumford-Shah Functional for Image Segmentation, Denoising, Interpolation, and Magnification." IEEE Transactions on Image Processing, 10(8):1169-1186. (2001).

Unser, Michael, "Texture Classification and Segmentation Using Wavelet Frames." IEEE Transactions on Image Processing, 4(11):1549-1560. (1995).

Vese, Luminita A. and Tony F. Chan. "A Multiphase Level Set Framework for Image Segmentation Using the Mumford and Shah Model." International Journal of Computer Vision, 50(3):271-293. (2002).

Von Ramm, Olaf T. and Stephen W. Smith. "Real Time Volumetric Ultrasonic Imaging System." Journal of Digital Imaging, 3(4):261-265. (1990).

Von Ramm, Olaf T. et al. "Real-Time, Three-Dimensional Echocardiography: The First Human Images." Circulation, 84(4):685. (1991).

Wachowaik, Mark P. et al. "Discriminatory Power of Speckle Model Parameters in Determining Scatterer Densities in Ultrasonography." Proceedings of the IEEE International Symposium on Signal Processing and Information Technology, pp. 147-152. (2001).

Wachowiak, Mark P. et al. "General Ultrasound Speckle Models in Determining Scatterer Density." Proceedings of SPIE, 4687, pp. 285-295. (2002).

Wang, Xun and William G. Wee. "A New Deformable Contour Method." Proceedings of the International Conference on Image Analysis and Processing, Venice, Italy, pp. 430-435. (1999).

Wells, Peter N. T. "Current Status and Future Technical Advances of Ultrasonic Imaging." IEEE Engineering in Medicne and Biology, pp. 14-20. (Sep./Oct. 2000).

Wickerhauser, M. "The Best Basic Algorithm. Adapted Wavelet Analysis from Theory to Software." pp. 273-298. (1993).

Wickerhauser, Miaden Victor. *Adapted Wavelet Analysis from Theory to Software*. A K Peters, Wellesley, MA. (1994).

Woog, Lionel. "Adapted Waveform Algorithms for Denoising." Yale University Dissertation. (Nov. 1996).

Xiao, Guofang et al. "Segmentation of Ultrasound B-Mode Images with Intensity Inhomogeneity Correction." IEEE Transactions on Medical Imaging, 21(1):48-57. (2002).

Xin, Y, et al. "Left Ventricular Boundary Detection in Echocardiographical Images Using Artifical Neural Networks." Signal Processing VI: Theories and Applications, pp. 1199-1202. (1992).

Xu, Chenyang and Jerry L. Prince. "Snakes, Shapes, and Gradient Vector Flow." IEEE Transactions on Image Processing, 7(3):359-369. (1998).

Yen, Jesse T. and Stephen W. Smith. "Real-Time Rectilinear Volumetric Imaging." IEEE Transactions on Ultrasonics, Ferroelectrics, and Frequency Control, 49(1):144-124. (2002).

Yezzi, Anthony et al. "A Geometric Snake Model For Segmentation of Medical Imagery." IEEE Transactions on Medical Imaging, 16(2):199-209. (1997).

Zeng, Xiaolan et al. "Segmentation and Measurement of the Cortex from 3-D MR Images Using Coupled-Surfaces Propagation." IEEE Transactions on Medical Imaging, 18(10):927-937. (1999).

Zhao, Hong-Kai et al. "A Variational Level Set Approach to Multiphase Motion." Journal of Computational Physics, 127:179-195. (1996).

Zong, Xuli et al. "Speckle Reduction and Contrast Enhancement of Echocardiograms via Multiscale Nonlinear Processing." IEEE Transactions on Medical Imaging, 17(4):532-540. (1998).

* cited by examiner

SPATIO-TEMPORAL TREATMENT OF NOISY IMAGES USING BRUSHLETS

CROSS-REFERENCE TO RELATED APPLICATIONS

This application claims priority under 35 U.S.C. §1.19(e) to U.S. Provisional Patent Application No. 60/475,106, filed on Jun. 2, 2003, entitled Spatio-temporal Denoising of 3D Ultrasound With Brushlet Thresholding, which is hereby incorporated by reference.

TECHNICAL FIELD

This application generally relates to image processing, and more specifically to analyzing and treating noise in medical image data.

BACKGROUND

A reliable noninvasive imaging modality is useful for evaluating and monitoring patients with cardiac disease. Traditional screening techniques for quantitative assessment of cardiac function include electromagnetic, acoustic, nuclear, and other modalities.

Multi-Gated Angiography (MUGA) is a slow screening modality that requires the injection of a radiopharmaceutical agent by a clinician. MUGA screening examines the pumping function of the heart. After injection of a radioactive agent that labels red blood cells, a nuclear camera creates an image of the heart's chambers by counting these cells over numerous cardiac cycles. The information obtained can quantify ejection fraction, but not ventricular volumes.

Magnetic Resonance Imaging (MRI) has been largely limited to university hospitals where there is a strong interest in research, despite the common availability of MRI machines in the United States. MRI is useful in evaluating patients' cardiac anatomy prior to surgery, in locating and characterizing cardiac tumors, and in identifying and treating cardiac abnormalities for children with complex congenital heart disease. These clinical situations are relatively rare and cardiac MRI has yet to become a commonly used tool in clinical medicine.

Computerized Tomography (CT) multi-detector technology has made cardiac CT possible, enabling angiography, perfusion and function studies. The main limitation of this screening modality remains the acquisition time with multi-row detectors, which motivates the use of new spiral CT, electron beam CT and ultrafast CT technologies.

Single Photon Emission Computed Tomography (SPECT), also referred to as myocardial perfusion imaging, is used to visualize myocardial blood flow distribution by intravenous injection of a radionuclide detected by a crystal gamma camera rotating around the patient's body. SPECT can be used to assess ejection fraction and regional wall motion but cannot provide detailed views of anatomical structures.

Positive Emission Tomography (PET) visualizes myocardial blood flow using intravenous injection of positron-emitting tracers detected by multiple rings of stationary detectors encircling the patient's body to produce a series of tomographic images of the heart. Specific tracers have been developed for the evaluation and quantification of a number of physiological processes, including regional myocardial blood flow, metabolic processes, oxygen consumption, receptor activity, and membrane function. Compared to SPECT, PET images are usually more accurate in clinical studies, but PET scanners remain costly and therefore less widely available than SPECT systems.

Two-dimensional Echocardiography (2DE) is relatively fast, cheap, and less invasive as a screening modality for imaging the heart. Because of the three-dimensional structure and deformation of the heart muscle during the cardiac cycle, analysis of irregularly-shaped cardiac chambers or description of valve morphology using 2D images can be challenging. Also, because 2DE is constrained to planar views, highly-trained clinicians are usually required to perform the screening. Screening examination protocols include the acquisition of multiple views of the heart at distinct phases of the cardiac cycle. This procedure is time consuming and does not guarantee that the entire cardiac volume and its important structures have been included in the acquired data. This can lead to situations where a patient may need to be screened a second time to acquire the information missing from the original exam.

Early nonlinear methods performed adaptive image filtering inside identified homogeneous regions, using statistical filters derived from synthetic aperture radar (SAR) imaging. Some filters were derived from weighted median filters, reassigning pixel values based on local averaging through a moving window.

A second class of filter denoising techniques consists of enhancing edges and contours rather than smoothing homogeneous areas. With this approach, geometric templates are applied as a set of filter banks and each point in the image is associated with the largest filter output, as a test statistic.

Some work was also done in the area of deconvolution, and has focused on the estimation of pulse-echo sequences from an original radio frequency (RF) signal acquired during tissue scanning. Denoising using nonlinear estimators models an ultrasound signal as the sum of a "true" signal component and an additive noise component. Estimation of the true signal component is performed using expansion of the acquired signal onto a set of basis functions and elimination of the noise components in the transform domain.

Modern imaging applications, and especially medical imaging, increasingly relies on three-dimensional image data obtained using sophisticated imaging arrays. Medical imaging systems also commonly incorporate temporal information as well as spatial information, e.g., in obtaining animated or time-sequence data with imaging and diagnostic devices. Therefore, new information (multi-dimensional and time-dependent information) is now available and can be used in mitigating the effects of noise on image quality, especially where a continuity of such information in time or space can be exploited.

Noise, such as speckle noise degrades the quality of medical images. In the field of medical image processing in general, and for ultrasound denoising in particular, denoising using wavelet expansion has been used for separating signal and noise components using nonlinear estimators or deconvolution paradigms. Both of these methods are performed using selective reconstruction of a "noise-free" signal by thresholding wavelet coefficients. Speckle noise characteristics depend on several parameters, including the ultrasound hardware design, acquisition protocol, orientation of the transducer during examination, and the acoustic window available in the patient.

Brushlet analysis was introduced around 1997 for the compression of images having directional texture, but not for removing noise from such images. An optimized system and method for analyzing images containing texture features and noise, e.g. medical images, is presently lacking, especially for multi-dimensional and time-varying images. Also, a description of favorable or best practices for applying image analysis processing steps to noisy images is also lacking in existing systems.

SUMMARY

One embodiment described herein is directed to a method for treating noisy image data, including performing a spatial denoising process on the image data, the spatial denoising process having a set of spatial coefficients; thresholding the set of spatial coefficients to produce spatially-denoised image data; performing at least one temporal denoising process on the spatially-denoised image data, the temporal denoising process having at least one set of temporal coefficients; and thresholding the at least one set of temporal coefficients to produce spatio-temporally-denoised image data corresponding to the noisy image data.

Another embodiment is directed to a computer software product for treating noisy image data, including a spatial filter adapted that receives the noisy image data and, the spatial filter corresponding to a set of spatial coefficients; a spatial threshold designed to perform a thresholding operation on the set of spatial coefficients and produce spatially-denoised image data; at least one temporal filter adapted that receives the spatially-denoised image data, the at least one temporal filter corresponding to at least one set of temporal coefficients; and at least one temporal threshold designed to perform at least one thresholding operation on the at least one set of temporal coefficients and produce spatio-temporally-denoised image data corresponding to the noisy image data.

Still another embodiment is directed to a system for treating noisy image data, including a spatial filtering element for receiving the noisy image data, having a corresponding set of spatial coefficients; a spatial thresholding element for performing a thresholding operation on the set of spatial coefficients and producing spatially-denoised image data; at least one temporal filtering element for receiving the spatially-denoised image data, the at least one temporal filtering element corresponding to at least one set of temporal coefficients; and at least one temporal thresholding element for performing at least one thresholding operation on the at least one set of temporal coefficients and producing spatio-temporally-denoised image data corresponding to the noisy image data.

The denoising processes may include brushlet analysis steps to remove or reduce the effects of textured noise components in space and/or time. Also, the thresholding process may be applied following any or each of the denoising processes, for example, by applying a hard threshold to the denoised data.

BRIEF DESCRIPTION OF THE DRAWINGS

For a fuller understanding of the nature and objects of the present disclosure, reference should be made to the following detailed description, in connection with the accompanying drawings, in which the same reference numerals are used to indicate the same or similar parts, wherein.

DETAILED DESCRIPTION

Figure 1:
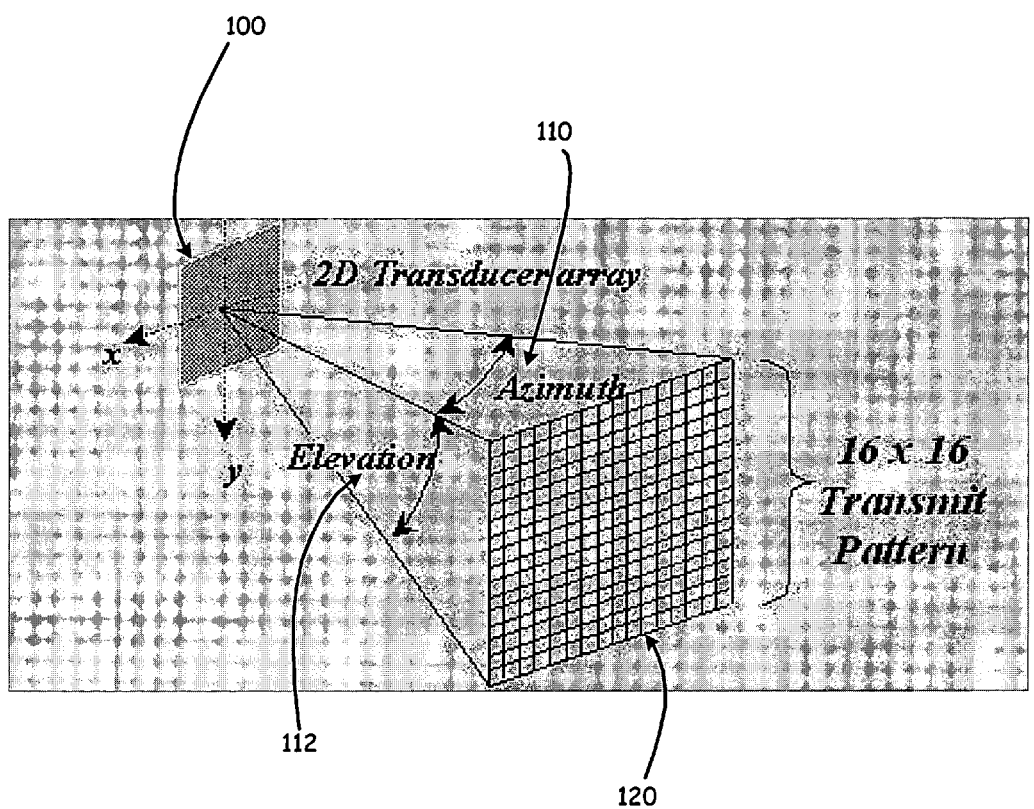
FIG. 1 illustrates an exemplary transducer array and transmit geometry.

Brushlet analysis of medical images, and other data sets, is promising in part because the brushlet basis functions are orthogonal and multi-scalar, allowing for new uses with images and data sets containing directional and textured features or noise. A mathematical description of brushlets is discussed elsewhere, such as in the doctoral dissertation of Elsa D. Angelini, entitled, "Spatio-temporal analysis of three-dimensional real-time ultrasound for quantification of ventricular function," available from Columbia University, New York City, which is hereby incorporated by reference.

The present inventors have extended the use of brushlet analysis into multiple dimensions (e.g. 3D) and have adapted the technique to the analysis and treatment of noise in images such as those available from medical ultrasound scans. Additionally, the present inventors have developed new and useful techniques, described below, for processing noisy image data such that the noise in the images can be mitigated or reduced, providing a less noisy (denoised) image. In medical applications this can be useful in removing noise that impairs diagnosis and treatment of patients. In one application, cardiac function is better studied and understood through improved imaging of the heart and cardiac structures.

It should be appreciated that while generally described in the context of multidimensional ultrasound imaging, the present disclosure and concepts are also applicable to other imaging modalities, such as nuclear imaging modalities. Also, medical imaging and images are not the only type of images that may benefit from the present concepts and inventions. But rather, many other imaging fields and data sets may benefit from the same concepts and inventions as well.

In some embodiments, the quality achieved by denoising via thresholding estimators can be determined by three factors: (1) the aptitude of the basis functions to decorrelate noise from signal components in different sets of coefficients, (2) the ability of a thresholding operator to preserve the smoothness of the signal to estimate, and (3) the adequacy of a threshold level to achieve an efficient tradeoff between noise removal and preservation of the signal information.

The present system and method include optimization and selection of parameters to obtain a best or an adequate denoising scheme. This includes optimization of spatial and temporal denoising parameters. Examples of spatial denoising parameters include: (1) dimension of spatial denoising (2D vs. 3D), (2) tiling of the Fourier transform, (3) thresholding operator, and (4) thresholding level. Examples of temporal denoising parameters include: (1) analysis domain (time vs. frequency) and (2) analysis sequence or order.

Early echocardiography denoising techniques were developed for 2D+time volumes. The recent introduction of three-dimensional ultrasound has provided a new use for true multidimensional filtering methods that incorporate the third spatial dimension.

FIG. 1 illustrates the geometry used to obtain real-time three dimensional (RT3D) ultrasound images in some exemplary configurations. A 2D ultrasonic transducer array 100 is positioned facing a sample, organ, or patient to be imaged (not shown). The transducer array 100 is excited with electrical signals of an appropriate amplitude and frequency to deliver ultrasonic energy to the sample, organ, or patient through some coupling medium (not shown) that carries the ultrasound to and from its target. The ultrasound travels in multi-dimensional patterns depending on the design of the transducer array 100 and the medium through which the ultrasound moves, and covers a region described by an azimuth 110 in the x-z plane, and an elevation in the y-z plane, where the face of the transducer array 100 lies roughly in the x-y plane, and the z-dimension is roughly perpendicular to the (x-y) plane of the transducer array 100.

A typical transducer array 100 used in medical imaging applications is circular in shape, and has a diameter of about 25 mm and an active aperture of about 15 cm. Proper phasing and control of the transducer array 100 is used to direct, shape, and steer an ultrasonic beam, and is known to those skilled in the art. In the example illustrated, the ultrasound source transmits 16 lines with four degrees between each line in each direction, spanning a total of 60 degrees azimuth and 60 degrees elevation. The transmit pattern 120 is shown in FIG. 1.

The receive pattern is pyramidal, with approximately the same azimuthal and elevation coverage. Sample signals are acquired slice-by-slice at evenly spaced depths. The spacing between the slices is about 0.308 mm in radial coordinates. This spacing provides 512 slices that are acquired by the transducer in receive mode. This corresponds to an operating frequency of between 2.0 MHz to 3.5 MHz, which is typical for medical imaging applications.

The transducer in the present example acquires about 40 frames per second, and can interrogate tissue to a depth of about 14 cm. For cardiac applications, about 15-20 frames per cardiac cycle are acquired. The system is coupled to a computing device having storage and processing capabilities, and generates about 46 Mbytes of data per second. Clinical data can be represented on a visual console and transmitted and shared to other machines across a network as desired.

Using the third dimension improves the quality of the denoised image data in terms of spatial resolution. When compared to 2D denoising, 3D denoising produces smoother features with better-localized contours. Specifically, small local artifacts not persistent in adjacent slices are eliminated, and weak contours persistent in adjacent slices are enhanced.

The brushlet functions provide an orthogonal basis of transient functions with good time-frequency localization. The brushlet basis functions are defined with true complex exponential functions on sub-intervals of the real axis as:

$$u_{j,n}(x) = b_n(x-c_n)e_{j,n}(x) + v(x-a_n)e_{j,n}(2a_n-x) - v(x-a_{n+1})e_{j,n}(2a_{n+1}-x),$$

where $l_n = a_{n+1} - a_n$ and $$c = \frac{l}{2}.$$

The two window functions $b_n$ and $v$ are derived from the ramp function r:

$$r(t) = \begin{cases} 0 \text{ if } t \leq -1 \\ 1 \text{ if } t \geq 1 \end{cases}$$

and $r^2(t) + r^2(-t) = 1$, $\forall_t \in R$.

The bump function v is defined as:

$$v(t) = r\left(\frac{t}{\varepsilon}\right) r\left(\frac{-t}{\varepsilon}\right), t \in [-\varepsilon, \varepsilon].$$

The bell function $b_n$ is defined by:

$$b_n(t) = r^2\left(\frac{t + l_n/2}{\varepsilon}\right) \text{ if } t \in [-l_n/2 - \varepsilon, -l_n/2 + \varepsilon]$$

and $$1 \text{ if } t \in [-l_n/2 + \varepsilon, l_n/2 - \varepsilon]$$

and $$r^2\left(\frac{l_n/2 - t}{\varepsilon}\right) \text{ if } t \in [l_n/2 - \varepsilon, l_n/2 + \varepsilon].$$

Finally, the complex-valued exponentials $e_{j,n}$ are defined as:

$$e(x) = \frac{1}{\sqrt{l_n}} e^{2i\pi j \frac{(x-a_n)}{l_n}}.$$

In order to decompose a given signal f along directional texture components, its Fourier transform $\hat{f}$ is projected on the set of brushlet basis functions:

$$\hat{f} = \sum_n \sum_j \hat{f}_{n,j} u_{n,j},$$

with the brushlet basis functions, $u_{n,j}$ and the brushlet coefficients, $\hat{f}_{n,j}$.

The original signal f can then be reconstructed by:

$$f = \sum_n \sum_j \hat{f}_{n,j} w_{n,j},$$

where $w_{n,j}$ is the inverse Fourier transform of $u_{n,j}$, which can be expressed as:

$$w_{n,j}(x) = \sqrt{l_n} e^{2i\pi a_n x} e^{j\pi l_n x} \{(-1)^j \hat{b}_n(l_n x - j) - 2i \sin(\pi l_n x) \hat{v}(l_n x + j)\},$$

with $\hat{b}_n$ and $\hat{v}$ the Fourier transforms of the window functions $b_n$ and v. Since the Fourier operator is unitary, the family functions $w_{n,j}$, which exhibit the wave-like structure with scaling factor $1_n$, and translation factor j, is also orthogonal basis of the real axis.

Figure 2:
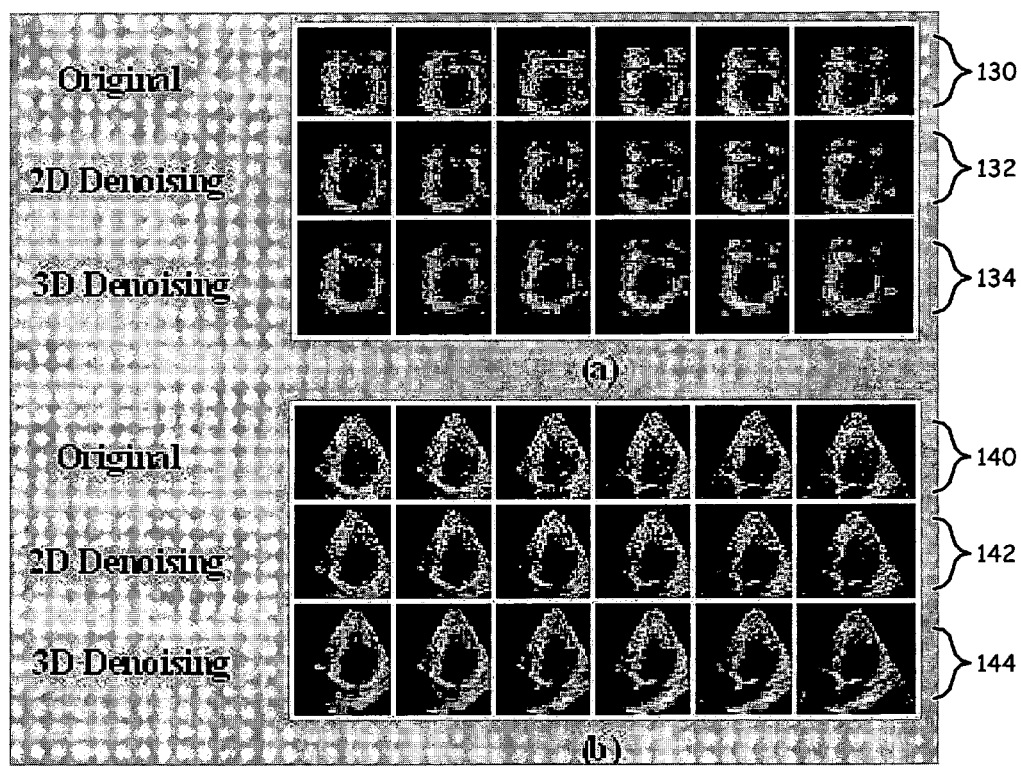
FIG. 2 illustrates 2D versus 3D spatial denoising of real-time three-dimensional (RT3D) ultrasound data.

FIG. 2 shows the results of denoising using 2D and 3D in space, and compares the results to the original noisy data. FIG. 2(a) shows comparisons of the original short-axis (across the beam) slices 130 for six exemplary frames against similar data denoised using 2D filtering 132 and denoised using 3D filtering 134. FIG. 2(b) shows comparisons of the original long-axis (along the beam) slices 140 for six exemplary frames against similar data denoised using 2D filtering 142 and denoised using 3D filtering 144. It can be seen from the results in FIG. 2 that 3D filtering provides better image quality and spatial resolution, while sometimes losing some contrast compared to 2D filtering. Also, weak contours in adjacent slices are generally enhanced in 3D filtered images.

Brushlet analysis employs tiling of the Fourier domain to affect which frequencies the original signal is to be analyzed at, and at which resolution it is to be expanded. The flexibility in partitioning the transform domain allows one to accommodate and precisely match the different sampling rates of each acquired dimension. Tiling influences the directionality and resolution of the brushlet analysis functions.

In some embodiments, evaluating the performance of the selected tiling in terms of enhancement and denoising improves when the anatomical features are not eliminated from the original data. This means that too fine a tiling is avoided in these embodiments since the spatial resolution during the reconstruction will be low. On the other hand, large sub-intervals are also avoided because they are generally not capable of eliminating high frequency speckle-noise components.

Figure 3:
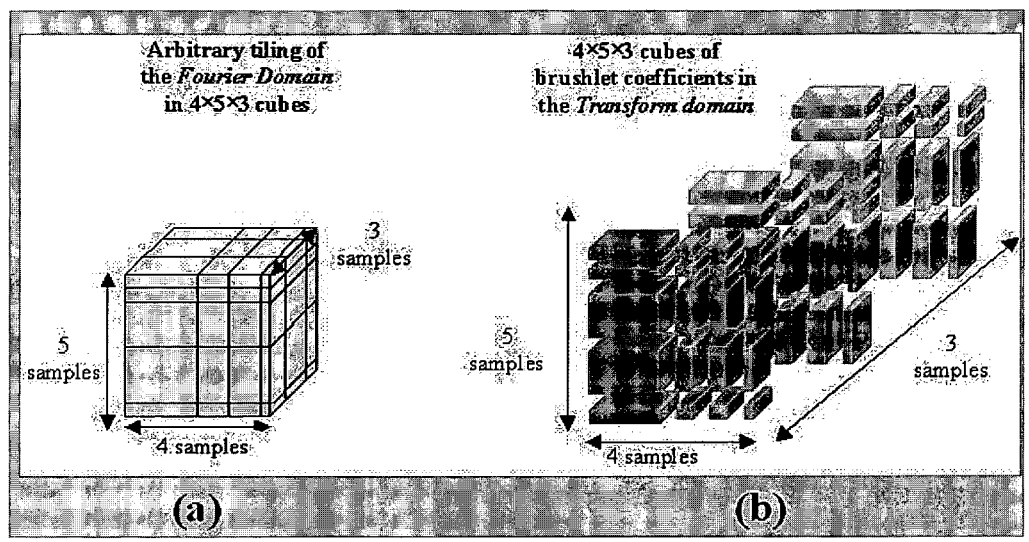
FIG. 3 illustrates Fourier domain tiling and the corresponding brushlet coefficients.

FIG. 3 illustrates the relationship between the tiling of the Fourier domain and the corresponding brushlet coefficients according to one example. FIG. 3(a) shows a 3D tiling of the Fourier domain with arbitrary sampling along each dimension (x, y, z). FIG. 3(b) shows the corresponding structure of the brushlet coefficients in the transform domain.

The Fourier domain may be tiled at regular or irregular intervals, with varying results on the denoised image. These observations, and the fact that real-time 3D (RT3D) ultrasound signals are not isotropic in the three spatial dimensions, suggest that non-regular tiling may be helpful for tuning the brushlet expansion for denoising of medical images.

There are as many basis functions as there are subintervals in the Fourier domain. The tiling defines the directionality and resolution of the brushlet analysis functions. A regular tiling of the Fourier domain divides the frequency axis into equal-length subbands along each dimension. In this case, the scaling factor of the brushlet functions (i.e. its resolution) is constant across each frequency subband. Other embodiments utilize irregular tilings, which correspond to varying brushlet resolution (brushlet scaling factor) across the frequency spectrum.

Studies with cardiac imaging showed that increasing the number of subintervals along a dimension provides smoother denoised data at the cost of blurring the contours and enhancing shadow effects inside the left ventricle (LV) cavity on the long-axis view of the imaging transducer. Experimentally, a good threshold between spatial and frequency resolution was achieved with a portioning of each dimension into four sub-intervals.

Figure 4:
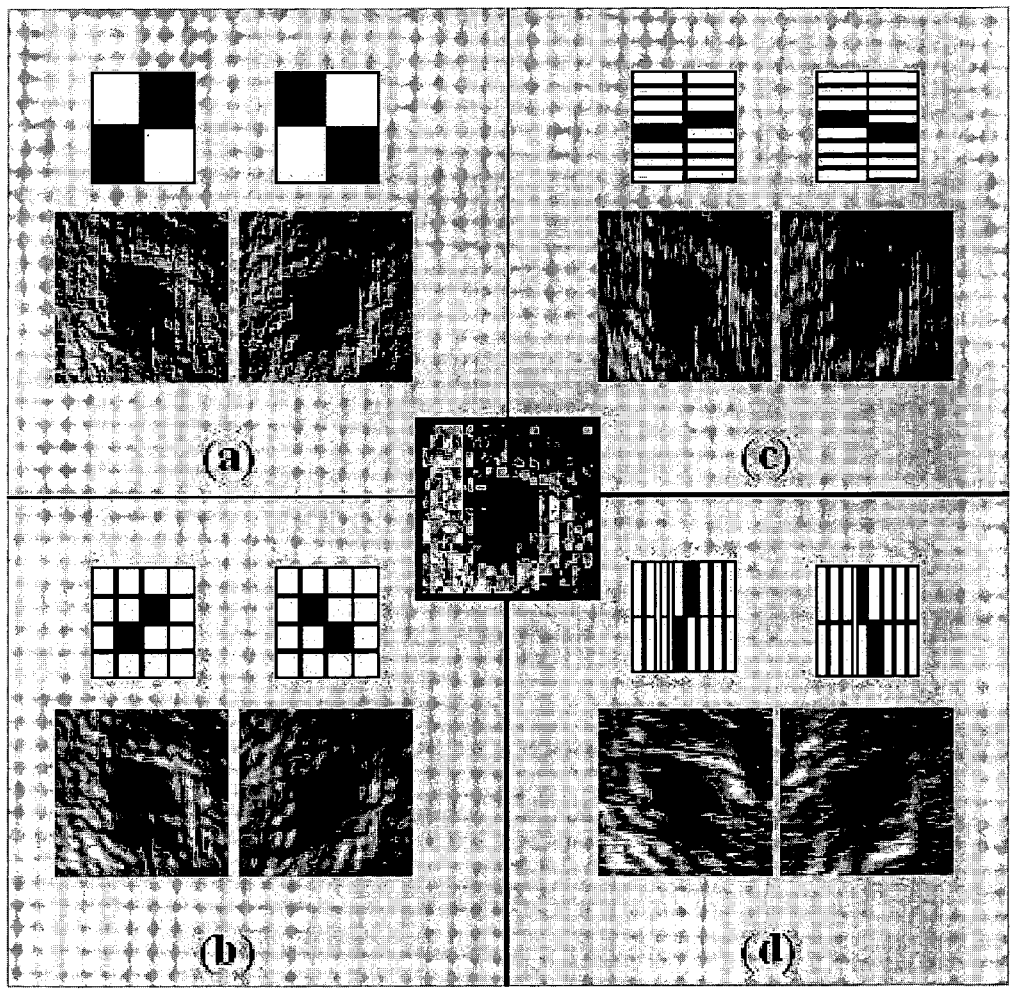
FIG. 4 illustrates an analysis of a short-axis and long-axis slice of an image.

FIG. 4 illustrates an example of Fourier domain tiling on the reconstruction of a short-axis slice of image data. FIG. 4(a)-(d) compare the reconstruction using 2×2, 4×4, 8×2 and 2×8 tiling, respectively, against the original noisy image data in the center of the figure. The filtered images in each instance are reconstructed using low-frequency diagonal coefficients at −45 degrees (left) and +45 degrees (right).

In some instances, a best basis framework identifies, given a family of basis functions and a particular task, the set of basis functions that optimizes the particular task at hand. The characterization as 'best' generally implies that a quality scale could be defined, and some basis functions produce a better (or best) result, depending on the goal of the process. Such tasks include encoding, compression, denoising and enhancement of a given signal. To identify a set of best basis functions, a cost metric was defined that quantifies the performance of the basis functions at expanding the signal into a representation suitable for the targeted task. This cost metric may be a real-valued function M.

For compression and denoising tasks, the cost function reflects the concentration of the signal information into a small set of coefficients. In this case the function M takes small values when all but a small set of coefficients are negligible and large values when all coefficients are of similar amplitude.

Once the cost function is defined, the basis search is performed using a library tree structure. This tree structure orders the functions within the given library into a collection of subspaces having inclusion relationship. In the case of brushlet family functions, the root of the tree structure is defined as the expansion into 2 sub-intervals per dimension (i.e. 2 intervals in 1D, 4 sub-quadrants in 2D and 8 sub-volumes in 3D). This expansion defines $2^n$ sub-element parents. Each dimension of these parent sub-elements is then further split into 2, creating $2^n$ children. For each sub-element, or node of the quadtree, a set of associated brushlet coefficients is computed. A cost function is then computed for the coefficients at each node. The search for the best basis is performed by comparing the children cost functions to their parent at each node, starting from the bottom of the tree. A set of $2^n$ children is grouped together if the sum of their cost functional is greater than the cost of their parents. As this aggregation process is performed from the bottom to the top of the tree, a global optimal tree is found and its corresponding optimal tiling is determined. The additive property of the cost function ensures that a single node is only traveled twice: once as a child and once as a parent, which provides a low computational complexity for the algorithm.

Figure 5:
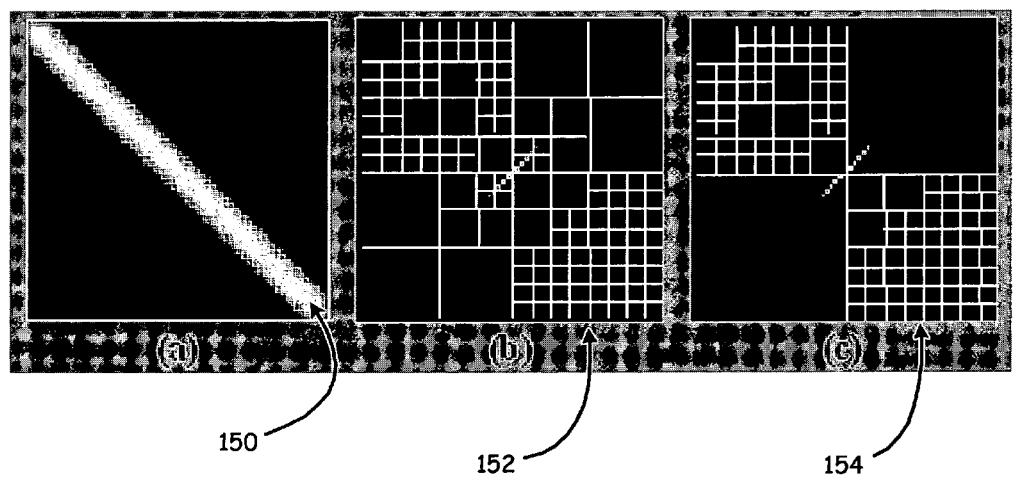
FIG. 5 illustrates a Fourier transform overlaid with optimal tilings.

In order to validate the best basis implementation for brushlet basis functions, the algorithm was run on a mathematical phantom image composed of a white diagonal line with black background as shown in FIG. 5. FIG. 5(a) shows the original image with a white diagonal feature 150. FIG. 5(b) shows the Fourier transform of the original image overlaid with an optimal tiling for $L^3$ norm 152. FIG. 5(c) shows the Fourier transform of the original image overlaid with an optimal tiling for $L^5$ norm 154.

Since the $L^1$ norm only measures the number of coefficients different form zero, and the $L^2$ norm is constant in the case of orthonormal basis functions, we used $L^p$ norms with p>2 to measure the concentration of the energy of a signal in few coefficients. The result for best basis partitioning of the Fourier domain, showed as expected that the diagonal quadrants of the Fourier plan with non-zero frequency components are decomposed in fine grids.

Then a best basis search algorithm was applied in 3D on a RT3D clinical volume. The optimal tiling of the Fourier volume came to be the regular tiling with four subintervals in each dimension, except in the higher frequency quadrant where a 2×2×2 tiling was selected. This result allowed a compromise between spatial and frequency resolutions with: (1) no selection of specific directional components in the lower frequency channels, and (2) a coarse decomposition of higher frequency terms containing principally speckle noise components with little coherence.

In this application, myocardial texture is rather isotropic in frequency. Therefore, regular tiling of the Fourier plan provided an adequate portioning that did not privilege any frequency or spatial direction.

Figure 6:
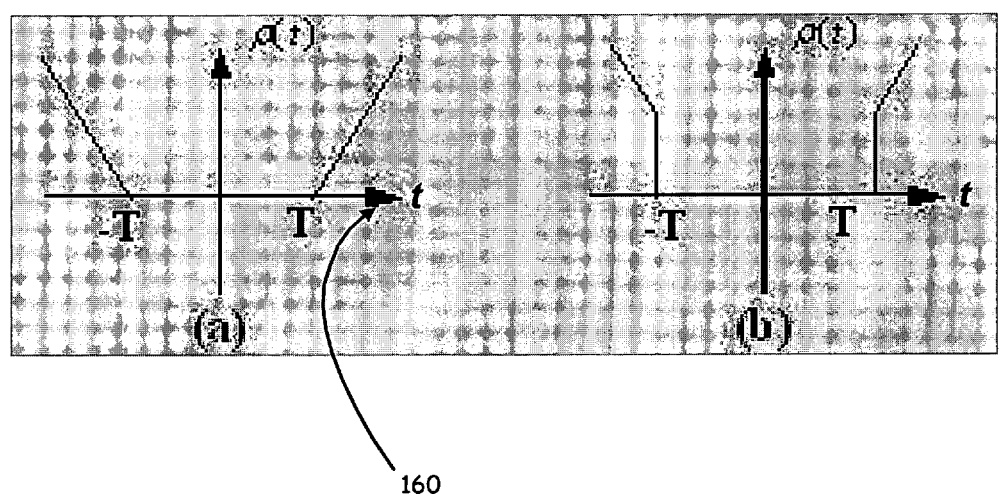
FIG. 6 illustrates the concepts of hard and soft thresholding.

It was mentioned that the image data is subjected to a thresholding process or operation to mitigate the effects of noise in the original image. Hard thresholding eliminates coefficients below a certain threshold, while soft thresholding eliminates coefficients below a certain threshold and reduces the amplitude of higher coefficients proportionally to their distance to the threshold level. FIG. 6 illustrates the operation of the hard and soft thresholding operators on a function p. Hard thresholding, illustrated in FIG. 6(a), sets the function to zero is the absolute value of the independent variable t 160 on the horizontal axis is less than some threshold T. Soft thresholding, illustrated in FIG. 6(b), sets the value of the function to zero only if the absolute value of the independent variable t 160 lies between (–T and T).

For denoising with brushlet coefficients derived in the frequency domain, soft thresholding will decrease the amplitude of the major harmonics of the signal, altering the textural content of the data, while hard thresholding will preserve their energy.

Two thresholding operators were tested for denoising of RT3D ultrasound data via brushlet analysis at 15%, 25% and 50% of coefficient maxima. It was found that hard thresholding is generally superior to soft thresholding at removing speckle noise and enhancing the myocardium wall. Spatial denoising introduces some blurring of features and this was more pronounced with soft thresholding.

The threshold level was chosen just above the maximum level of the noise. When no information about the noise is available, one approach for selecting this level is to set it to a percentage of a coefficients' maxima. This approach, referred to as global thresholding, assumes that the noise component is encoded in low amplitude coefficients to rest while high coefficient values encode the true signal component.

Minimax nonlinear estimation was developed for reconstructing a signal from a noisy observation with minimal risk (i.e. minimization of the maximal mean square error of estimation). Denoising is performed by expanding the observation signal on a set of brushlet basis function and thresholding of the coefficients prior to reconstruction. The framework of minimax thresholding was developed for white Gaussian noise.

Figure 7:
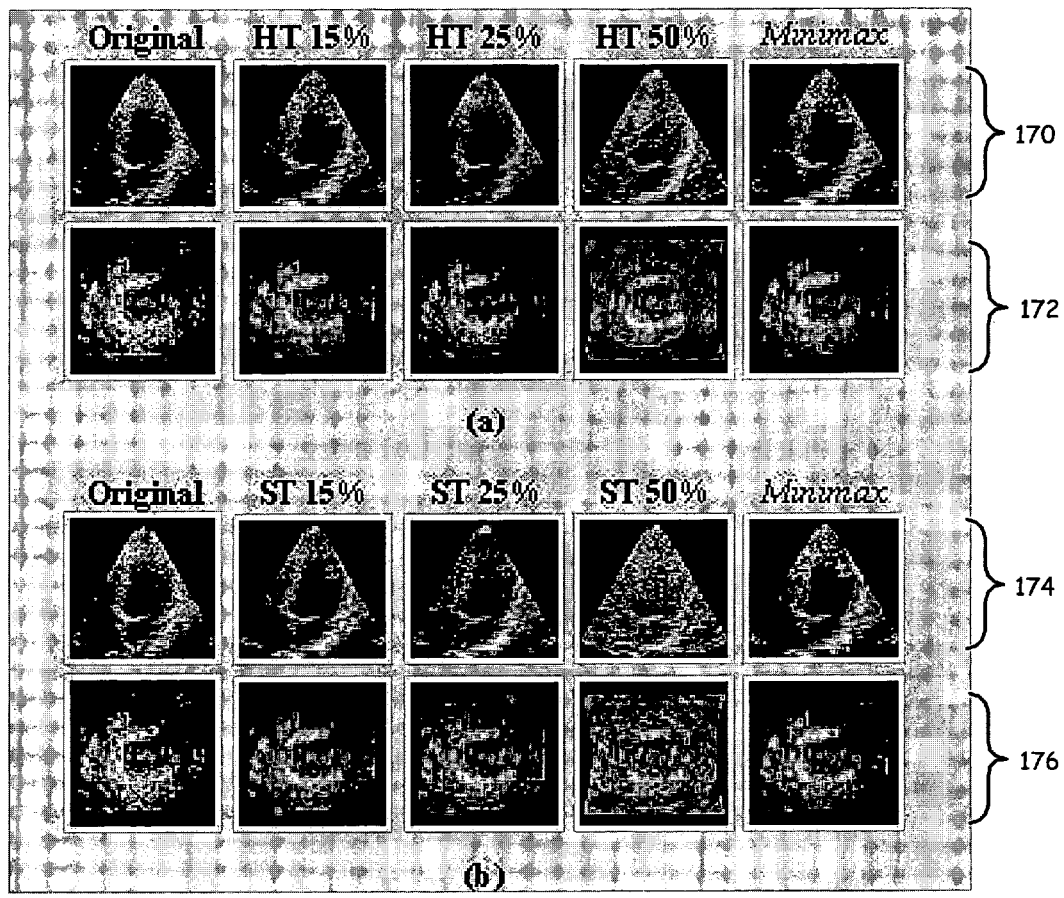
FIG. 7 illustrates denoising of RT3D ultrasound using thresholding.

FIG. 7(a) illustrates results from denoising two orthogonal slices of image data 170, 172 using a variety of hard thresholding parameters (HT). FIG. 7(b) illustrates results from denoising the same two orthogonal slices of image data 174, 176 using a variety of soft thresholding parameters (ST). In general for this type of data, hard thresholding provided superior results to soft thresholding.

Regarding global thresholding, a compromise exists between high threshold values that remove part of the myocardium wall and low threshold values that perform poorly at removing speckle noise. Empirical testing on several data sets suggested that 25% of coefficients' maxima achieved a balanced compromise between removal of speckle noise and preservation of original structures. More interesting is the comparison between global thresholding and adaptive minimax thresholding. We observed better performance when using minimax thresholding in preserving and even enhancing myocardium wall borders. Adaptive minimax thresholding provided denoised data with better-delineated myocardium walls in the short-axis view and brighter myocardium signal in the long-axis views.

Tiling of the Fourier domain does not appear to significantly influence denoising performance on RT3D ultrasound. This fact may be explained by both the limited resolution in the short-axis dimension that confines the possibilities of fine sampling for frequency analysis and the isotropic characteristics of the myocardium texture in both space and frequency, which is well-characterized with regular tiling.

The present inventors have observed that, generally, hard thresholding was visually superior to soft thresholding at removing speckle noise and enhancing myocardium wall. Minimax thresholding generally performed better than global thresholding at enhancing cardiac structures. The performance of minimax thresholding was confirmed quantitatively with denoising on phantom data.

The results presented here for testing on the thresholding operator lead to the conclusion that minimax hard-thresholding was best suited for removing speckle noise components while enhancing myocardium walls, leading to denoised data with better contrast and good preservation of the original texture of cardiac muscle.

In typical clinical practice, clinicians display ultrasound time frames in motion to make their final decision on the exact location of moving cardiac structures such as mitral valves and myocardium wall borders on a particular frame image. The inclusion of the temporal dimension in the brushlet denoising scheme uses similar temporal averaging approaches by incorporating spatial coherence in time to enhance moving structures while at the same time eliminate non-coherent noise.

Figure 8:
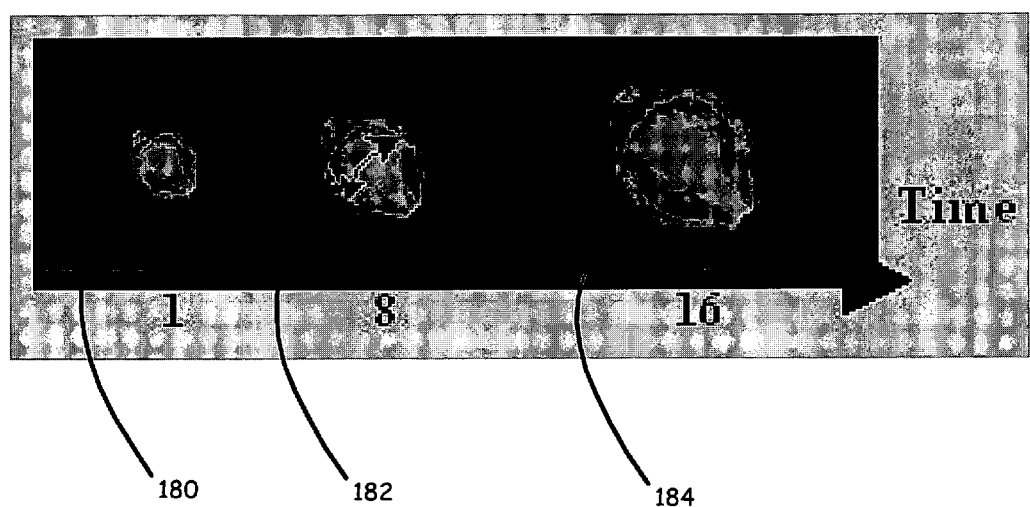
FIG. 8 illustrates an exemplary mathematical ovoid phantom.

To quantitatively evaluate the potential denoising performance improvement brought by including the temporal dimension, initial testing was performed on a mathematical phantom. The phantom consisted of an ovoid volume growing in time that schematically mimicked aspects of the left ventricle with an inner gray cavity surrounded by a thick white wall on a black background. The size of a single volume was 64×64×64, and there were 16 frames growing in time. The volume increased by 70% over 16 time frames, similar to the average ejection fraction in normal patients. FIG. 8 shows the mathematical phantom of the ovoid 180, and illustrates its growth over the 16 frames, including at 8 frames 182 and at 16 frames 184.

The phantom was corrupted with two types of noise, multiplicative speckle noise with uniform distribution, and multiplicative speckle noise with Rayleigh distribution. The level of speckle noise was set so that the SNR of the noisy data was equal to –15 dB.

Denoising was carried out with both 3D and 4D brushlet analysis. Regular tiling was applied with four subintervals in each dimension. Volumes were reconstructed after resetting the higher frequency coefficients and hard thresholding the lower frequency coefficients at 25% of their maxima.

Figure 9:
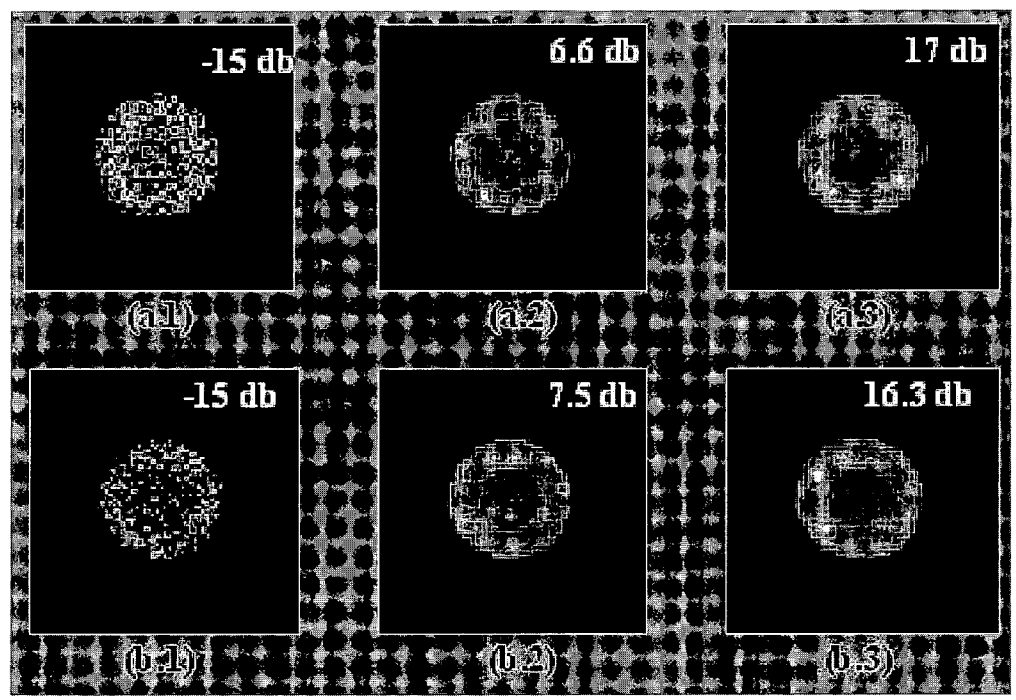
FIG. 9 illustrates denoising of the mathematical phantom.

FIG. 9 illustrates the results of a series of exemplary denoising procedures carried out on an image containing uniformly distributed speckle noise (FIG. 9(a) series) and Rayleigh distributed speckle noise (FIG. 9(b) series). The frames labeled (a.1) and (b.1) are the original noisy images, frames (a.2) and (b.2) were denoised using a 3D brushlet expansion, and frames (a.3) and (b.3) were denoised using a 4D brushlet expansion. SNR values are indicated for each image set.

In the example studies, it was found that including the temporal dimension improved the denoising performance. From a qualitative point of view, the contrast of the denoised slices was improved and had a higher definition of borders and more homogeneity inside the white and gray areas. The SNR values were improved by 50% between 3D and 4D denoising.

Performing multidimensional analysis on cardiac clinical data takes advantage of the continuity of spatial and temporal frequency content of multidimensional RT3D signals. The high level of speckle noise in ultrasound clinical data sets recorded with the real-time 3D transducer, the non-uniform absorption coefficients of cardiac tissues, and the motion of the heart contribute to the addition of artifacts that can either add echo-like signals inside the cavity or suppress echo signals from the myocardium wall. These artifacts complicate the segmentation task by introducing artificial edges inside the cavity or destroying edges at the epicardial and endocardial borders. Since these artifacts are not persistent in time, including the temporal component in the analysis helps resolve them.

To illustrate the aptitude of the brushlet analysis to repair missing contour information, the previous mathematical phantom was modified by removing a part of the white wall in the eighth time frame. Both 3D analysis on the time frame with the defect and 4D brushlet analysis applied to the sixteen time frames were computed after corruption with Rayleigh speckle noise.

Figure 10:
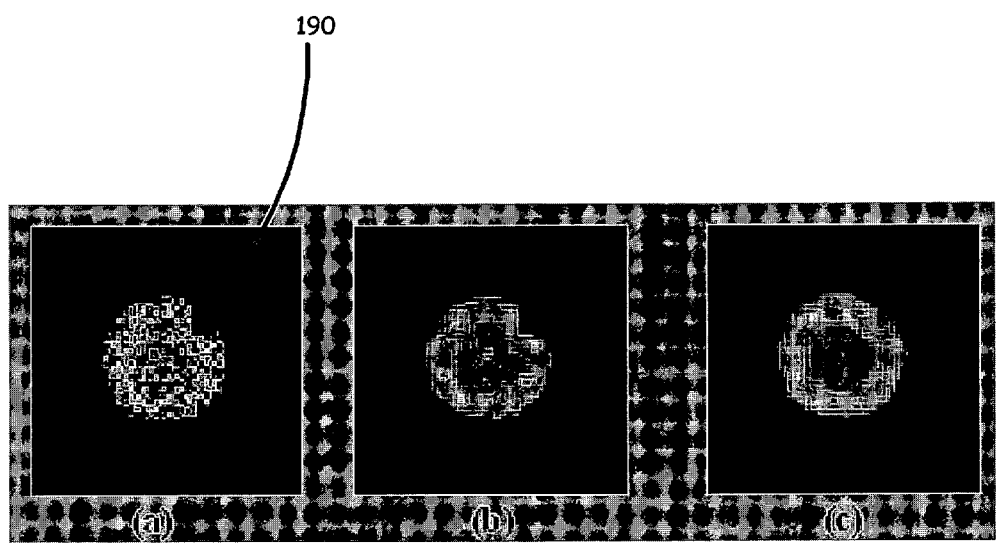
FIG. 10 illustrates denoising results in 3D and 4D.

FIG. 10 illustrates how a defect (missing corner) of the noisy model (FIG. 10($a$)) was altered upon denoising the slice with 3D brushlet analysis and with 4D brushlet analysis. Correction of the wall defect was observed with the 4D (3D+time) brushlet denoising (FIG. 10($c$)) that could not be obtained with 3D analysis alone (FIG. 10($b$)). This type of artifact is analogous to the dropouts in echo signals that result in loss of myocardium tissue in some frames or the introduction of tissue-like signals inside the cavity. Such artifacts are not persistent in time and could be removed with the inclusion of temporal dimension in the denoising process.

Using a brushlet basis, the following two approaches may be used to perform denoising and enhancement in time: (1) one can either analyze the temporal dimension directly or analyze the Fourier transform of the time dimension. When projecting the time dimension on brushlet functions, thresholding of low amplitude coefficients aims at isolating coherent mechanical movements of anatomical structures that can be expressed as a sum of complex exponentials. Such movements are analogous to harmonic pendulum oscillations that can be decomposed into a sum of sine and cosine components; (2) The second approach comprises isolating movements of 2D slices in time by performing 3D (2D+time) brushlet analysis in the Fourier domain. This corresponds to identifying textural movements via frequency information. Since movement of the myocardium wall is better characterized as planar z dimension and provides better acquisition resolution than x and y dimensions.

The approaches outlined above are not exhaustive, but are provided for illustrative purposes. The choice of which of the above approaches to take may be guided by processing a mathematical phantom having a smooth surface deforming in time with harmonics derived from a random orientation process. In one example, such a phantom was corrupted with speckle noise having a random process of mean zero and variance 10. This mathematical phantom was denoised in 2D space and time by combining the two approaches given above. Spatial denoising was performed using 2D brushlet analysis on each slice with global hard thresholding and minimax hard thresholding. Time denoising was performed using brushlet analysis and global hard thresholding at 15% of the coefficients maxima. Five denoising sequences were tested: (1) spatial denoising (2D), (2) spatial denoising (2D)+(a) temporal denoising (2D+time) in frequency, (b) temporal denoising (1D) in time, (3) spatial denoising (2D)+(a) temporal denoising (2D+time) in frequency and temporal denoising (1D) in time, (b) temporal denoising (1D) in time and temporal denoising (2D+time) in frequency.

Identification of a favorable or best denoising paradigm raised the following two questions: (1) what analysis domain (time vs. frequency) is best suited for expansion of the temporal dimension onto brushlet basis functions? and (2) if combining the two domains, what analysis sequence is best suited for denoising performance?

When including the time dimension in the denoising process, one can choose to either process the time dimension followed by 3D spatial analysis or start with 3D spatial analysis and then process in time. The order of the filtering can change the visual quality of the denoising. The order in which each dimension is processed can also influence the denoising performance in the case of cardiac MRI and cardiac PET images.

Figure 11:
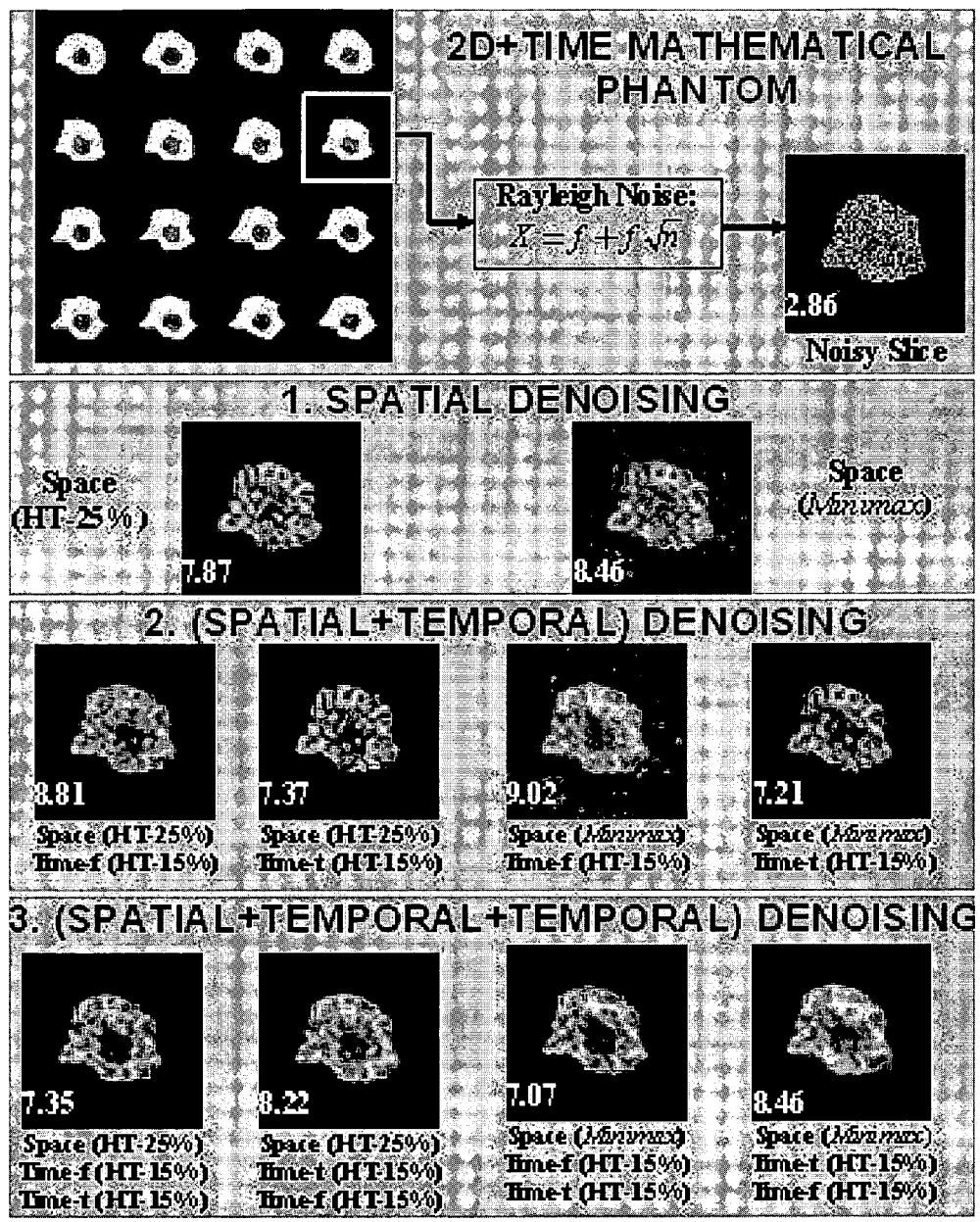
FIG. 11 illustrates denoising in space and time for a (2D+time) mathematical phantom corrupted with Rayleigh noise.

FIG. 11 illustrates graphically the process of denoising according to a favorable sequence of filtering operations to obtain a less noisy final image. An original image corrupted with Rayleigh speckle noise was used as a baseline. Spatial denoising was performed and either hard thresholding or minimax thresholding. Temporal denoising was performed with brushlet analysis in the frequency domain (time-f) with 2D brushlet analysis on volumes formed by 2D slices in time, and the time domain (time-t) on individual voxel data in time with hard thresholding. SNR values are shown for each denoising method and sequence.

Denoising performance was evaluated qualitatively via visual inspection and quantitatively via signal to noise ratio (SNR) measures. In general, including time in the denoising process improved the performance both qualitatively and quantitatively. However, the order of the time processing sequence had an influence on denoising quality. From a qualitative point of view, combining temporal and frequency denoising in the time direction improved visual performance in some embodiments by enhancing edges and increasing contrast when compared to single time denoising (either in time or frequency). Also, minimax thresholding outperformed global thresholding for denoising quality in most phantom data experiments.

Overall, denoised RT3D ultrasound exhibited increased contrast, homogeneous myocardial texture, and better definition of myocardium borders at the epicardial and endocardial walls without smoothing artifacts.

Performance of brushlet analysis to decorrelate signal from speckle noise components in space and time was demonstrated on a mathematical phantom and clinical RT3D data. Analysis and thresholding parameters were tested to identify the set of parameters that perform well for removing speckle noise and enhancing coherent structures. The set of useful parameters both qualitatively on RT3D ultrasound data and quantitatively using phantom data and SNR measurements was identified. In general, RT3D clinical data indicate a superiority of 3D over 2D spatial denoising. Extending the denoising in three dimensions fully exploits continuity of structural patterns in all spatial directions.

Testing on clinical RT3D data and phantom data showed that combining temporal denoising in both time and frequency significantly improved denoising performance. One sequence that demonstrated favorable SNR improvement on phantom data was: spatial denoising (2D)+temporal denoising (1D) in time+temporal denoising (2D+time) in frequency. When inversing the temporal denoising sequence, contrast was typically improved. However, some wall structures were removed, introducing artifacts along the borders.

In-vitro and in-vivo studies were performed to validate the brushlet denoising method for enabling the use of automatic segmentation methods for quantification of ventricular function using RT3D ultrasound. Several studies were performed to assess the ability of the segmentation technique to provide accurate quantitative measures of cardiac function. First, an in-vitro study was performed with balloon volumes immersed in a tank of water. Then, two clinical studies were performed with normal and symptomatic patients for quantification of ventricular volume and ejection fraction.

A set of in-vitro contrast echocardiogram phantoms comprising balloons filled with human albumin was screened with RT3D ultrasound. A layer of bubbles was artificially created on the internal wall of the balloon to mimic the appearance of the white myocardium and increase the contrast at the wall interface. Ultrasonic RT3D data was acquired with the machine configured identical to clinical conditions. The entire phantom database acquired by the Echocardiography Laboratories included 2 balloons with volumes equal to 35 ml and 65 ml. Each RT3D volume had a size of 64×64×258 voxels. Since the volume spanned by the transducer beam is conical, voxel position was determined in cylindrical coordinates. Each sample slice in the z direction (depth) was separated by 0.308 mm. For each slice, 64×64 points were recorded spanning a total azimuth and elevation angles of 63° with 1° increment. With a total depth of acquisition of 7.92 cm, the pixel resolution in short axis slices (perpendicular to the transducer axis) ranked from 1.736 $mm^2$ (closer to the transducer) to 0.1382 $cm^2$ (further away from the transducer).

Brushlet analysis was performed in 3D with a tiling of the Fourier domain partitioned by 4×4×4 cubes as described previously. Denoising was performed in space via hard thresholding of the lower-frequency coefficients at 25% of coefficient maxima. Next, a cardiologist performed manual tracing on the same slices that were segmented with the deformable model, using a custom-designed interface.

Segmentation was carried out using a 2D deformable model on each slice. The model was initialized with a 4 pixel-radius circle inside the cavity to segment. The center of the circle was identified by a circular Hough transform applied on the edges extracted with a Prewitt filter for every 10 slices of the volume. For each inspected slice, if more than one circle was detected, no center point was selected and the next slice inspected. In this fashion for every group of 10 slices we either selected one center point or none.

The parameters of the best linear fit in the least squared sense was computed over the entire set of center points detected. Two linear models $x=az+b$ and $y=az+b$ were obtained to determine the x and y coordinates of the center points for each slice z. The circular Hough transform had been applied previously to RT3D data for volume measurements on balloon phantoms. However, because of the incidence of spurious edges in ultrasound data, a simple Hough transform on single slices might detect several different circles. Missing edges on the other hand can lead the Hough transform to shift the position of the center of the circular cavity. A linear best fit on the series of center points was observed to be well suited to handle these errors and provided a robust initialization compared to a single slice Hough transform.

A second set of experiments was conducted on clinical data. As an example, a database of six healthy volunteer patients co-screened with cardiac MRI was used for validation of LV volume segmentation and measurement. MRI data were acquired either before or after the echocardiographic examination. Typical RT3D volumes contained 400 slices in the long axis dimension with a slice thickness of 0.308 mm. Between 21 and 26 frames were acquired per cardiac cycle, depending on patient's heart rate.

Brushlet analysis was performed in 3D for spatial denoising followed by 1D analysis along time for enhancement of cardiac structures. Tiling of the Fourier domain was set to four sub-intervals in each direction. Denoising in space was performed via hard thresholding of the lower frequency components at 25% of coefficient maxima. Enhancement was then performed in time via soft-thresholding at 15% of coefficient maxima. Threshold values in space and time were empirically set via testing on clinical data sets to achieve a good tradeoff between removal of noise artifacts and enhancement of cardiac structures. This clinical study did not include the temporal denoising in (2D+time) nor the use of minimax thresholding.

Rescaling of the volumes from spherical coordinates to Cartesian coordinates via linear interpolation was performed prior to segmentation to produce isotropic volumes with identical resolution in each of the three dimensions. Even though rescaling introduced some smoothing that could introduce error in the location of the anatomical structures, it was necessary to provide the cardiologist with isotropic data for manual segmentation. Deformable model segmentation should be performed on rescaled data in some instances for consistency in the comparison with MRI data. It should be appreciated nevertheless that segmentation with a deformable model may be performed in the original spherical coordinate representation. In one example, spatial resolution in the acquired volumes was along the long-axis with a pixel size of 0.308 mm and having over 400 slices. Because of the computational time needed for the segmentation process, whether manually or with the deformable model, it may be useful to downsample the rescaled volumes. In one embodiment, the downsampling may be done by a factor of two, reaching a compromise between accuracy of tracing and processing time. In the same embodiment, 100 slices were segmented (on average) for each volume with a voxel resolution of $(2 \times 0.308)^3 = 0.231$.

End-diastole and end-systole time frames were identified by a cardiologist by visual inspection corresponding to frames with end of expansion (end-diastole) and end of contraction (end-systole). The volumes were reviewed using 3Dechotech©software, installed on clinical workstations for a dynamic 3D display of RT3D data with information on the time frames. The volume was viewed using arbitrarily oriented slices with multiple simultaneous views. The same EDV and ESV time frames were used for both manual tracing and deformable model segmentation.

A trained cardiologist performed manual tracing on the same slices that were segmented with the deformable model, using a custom-designed interface. RT3D volumes were downsampled by a factor of two in each direction prior to segmentation, leading to a resolution of 0.616 mm in the axial direction. After downsampling, each volume contained on average 100 slices to segment and the whole procedure took about 20 minutes for completion.

Deformable-model segmentation was performed on the denoised data. The model was initialized with a 5 pixel-radius circle inside the cavity to segment. An operator manually selected the centers of the circle for every 10 slices since the circular Hough transform applied to the balloon data sets failed to produce accurate center estimations in this case. Center locations for in-between slices were determined via linear best fit. By identifying the best linear fit to the center points detected inside the LV cavity, an approximation of the LV medial axis was defined.

Absolute errors of quantitative measures were computed for volumes and ejection fraction. Additionally, mean-error values and standard deviation were calculated for six cases for the three quantitative measures discussed earlier.

A second clinical study was performed for quantification of right and left ventricular function in patients diagnosed with pulmonary hypertension (PH). This condition results in narrowing of the pulmonary blood vessels that leads to increased pressure in the right ventricle and eventually heart failure. Pulmonary hypertension is either primary with unknown cause or secondary when associated with congenital heart disease or induced by drug administration. The real incidence of pulmonary hypertension is difficult to evaluate and there are no treatments available to cure or halt its progression. Diagnosis of PH is very delicate since preliminary symptoms such as chest pain and shortness of breath are not very specific. Because of the increase in RV pressure, the RV volume increases affecting the pumping function on the right side while, at least in the initial phase of the condition, the left ventricle volume and ejection fraction remain normal. As the condition worsens, RV size increases and, its shape becomes rounder wile the LV cavity is compressed.

Quantification of ventricular volume from standard two-dimensional echocardiography is commonly performed via planar measurements and use of a geometric model for volume estimation. This method is routinely applied in clinical practice for assessment of left ventricular (LV) volume and ejection fraction. The left ventricle has an ellipsoidal shape with strong symmetry along a central axis, which allows volume estimation from 2D echocardiographic images using geometrical models. On the other hand, the right ventricle is crescent-shaped and does not typically have an axis of symmetry. For this reason, right ventricular volume cannot be easily estimated from planar views, and its function is not well quantified during an echocardiographic examination. In such situations, RT3D ultrasound appears to be a useful screening tool, as it can acquire the entire RV cavity in real-time to visually depict anatomical changes and quantify LV and RV cardiac function for early diagnosis and accurate assessment of the severity of the pathology.

To test the above hypothesis, LV and RV volume and ejection fraction measures were compared with RT3D ultrasound and MRI for 10 volunteer patients suffering from pulmonary hypertension (IRB protocol and signed agreements were obtained for this study). The set of patients included 7 females and 3 males, age ranging from 6 to 63 years (median age was 33 years). All patients had pulmonary arterial hypertension. Eight of them had primary pulmonary hypertension and two had secondary pulmonary hypertension associated with con-genital defects (one with multiple ventricular septal defects closed at 9 and 24 months of age and one with a sinus venosus defect). MRI data were acquired either before or after the echocardiographic examination. Manual tracing was performed on each modality by two cardiologist, blinded from each other's results. Typical RT3D volumes contained 300 slices in the long axis dimension with a slice thickness of 0.308 mm. Between 10 and 17 frames were acquired per cardiac cycle.

A denoising protocol as described earlier was used in this study. Brushlet analysis was performed in 3D for spatial denoising, followed by temporal denoising in 1D and (2D+time) for enhancement of cardiac structures. Tiling of the Fourier domain was set to four sub-intervals in each direction. Denoising in space was performed via minimax hard thresholding of the lower frequency components. Temporal denoising in 1D and (2D+time) were performed with hard thresholding at 15% of coefficients maxima. The threshold value for temporal denoising was empirically set via testing on clinical data sets to achieve a good tradeoff between removal of noise artifacts and enhancement of cardiac structures.

A cardiologist manually traced endocardial contours on selected slices and computed ventricular volumes via sector plane-disk summation using a dedicated software package from 3Dechotech©. Manual tracing was performed on the raw data.

The MRI data was acquired with a 1.5 T clinical scanner using a standard protocol. The slice thickness was 8 mm, with no gap in between. Acquisition was performed at a rate of 40-50 milliseconds per frame. A radiologist manually segmented the entire set of 10-15 two-chamber views acquired for each patient with a dedicated software package. End diastole and end systole volumes were manually identified. Ventricular volumes were computed by adding slice areas, without using geometrical models.

For the two modalities, trabeculations and papillary muscles were excluded while moderator bands were included inside the cavity. Two-dimensional deformable-model segmentation was performed on the denoised data following the same protocol as for the first clinical study.

Three-dimensional deformable-model segmentation was performed on the denoised data. The model was initialized similarly to the two-dimensional case, by manually selecting a center position inside the cavity to segment. But, unlike to the two-dimensional example, it was not required to define the model as entirely inside the cavity nor was it necessary to initialize it on every slice to segment. On the other hand, the Mumford-Shah functional was less stable than the two-dimensional balloon model as it converged towards the myocardium wall borders.

The model was initialized as a cylinder with an ellipsoidal cross-section. The center and dimension of the ellipse were set up manually for each volume on the middle slice between the base and the apex of the ventricle. The ellipse dimensions were defined to reflect the ratio of dimensions of the ventricle, but the ellipse itself did not need to be close to the borders of the ventricle. It was observed that using an ellipsoidal cross section instead of a circle as for the two-dimensional model improved the stability and convergence of the iterative process. The cylinder height was defined from the base through 20 slices before the apex. By not including the apex, the model was allowed to deform in the third dimension from slices above that had better resolution, avoiding problems of instability and over segmentation as encountered in the two-dimensional case.

The ten patients used in this study presented diversity in the quality of the data and the shapes and sizes of the ventricles. Quality of the ultrasound data depended on the acoustic window of the patients and on the ability of the cardiologist to acquire a good view of each patient's heart that substantially included the ventricular cavity.

In several cases, acquisition parameters were adapted to increase the depth setting and the field of view. Because of the enlarged RV cavity, the LV can become small in some patients and its shape becomes distorted. The deformable model is useful in such situations, as it can accommodate convex shapes while providing continuity and smoothness of the contour. Volume ranges for this study were as follows: RV-ESV 71.5-269 ml, RV-EDV 123.03-311.5 ml, LV-ESV 19.0-82.2 ml, LV-EDV 41.5-144.8 ml, RV EF 9.1-51.6% and LV EF 30.4-74.5% as obtained with manual tracing on MRI and RV-ESV 49.1-191.3 ml, RV-EDV 96.5-250.6 ml, LV-ESV 11.8-50.8 ml, LV-EDV 35.8-78 ml, RV-EF 44.2-68.1% and LV-EF 40.8-68.1% as obtained with manual tracing on RT3D ultrasound.

Absolute errors of measures were computed for RV and LV ejection-fraction. The mean-error values were calculated, and the standard deviation over the ten cases for the two ventricles was determined.

It was observed that for the right ventricle, comparable performance on average of the three segmentation methods applied to RT3D ultrasound. For this ventricle, ejection fraction estimation was usually better estimated with the deformable model, while manual tracing performed better to estimate volumes. For each segmentation method, measurement accuracy was lower with the right ventricle. This result could be explained by the fact the right ventricular volumes (mean ESV=150.61 ml, mean EDV=201.35 ml, for MRI estimations) were bigger than the left ventricular volumes (mean ESV=39.23 ml, mean EDV=89.65 ml, for MRI estimations) as higher quantification errors for bigger volumes was also reported in similar study using RT3D ultrasound.

Higher RV volume measures were observed with MRI (mean ESV=150.61 ml, mean EDV=2-1.35 ml), when compared to estimates from manual tracing non-RT3D ultrasound (mean ESV=98.9 ml, mean EDV=130.9 ml), whereas LV volumes and EF of both ventricles were within similar ranges for the two modalities. Even though manual tracing was performed using the same anatomical definition of the ventricular cavity, one can identify some potential sources of error to explain this. MRI image quality is generally superior to ultrasound, but its spatial resolution was 26 times lower in the long axis dimension, leading to potential volume effect errors with MRI. Manual tracing on RT3D ultrasound was performed on the long axis view of the original data by a first cardiologist. A second cardiologist selected planes at the apex and at the base of the heart on denoised long-axis views for segmentation with deformable models. The right and left ventricular cavity segmentations were performed on different volumes for RT3D data, but on the same volume for MRI. Finally, because of the enlarged right ventricular cavity, RT3D data provided truncated volumes for some patients with disease, leading to potential underestimation for volume measure with ultrasound data.

Without using the present brushlet denoising procedure it was difficult or impossible to perform an automatic segmentation on the deformable model. When trained clinical personnel performed the segmentation manually, it more closely tracked the automated results for denoised data than for noisy data.

Figure 12:
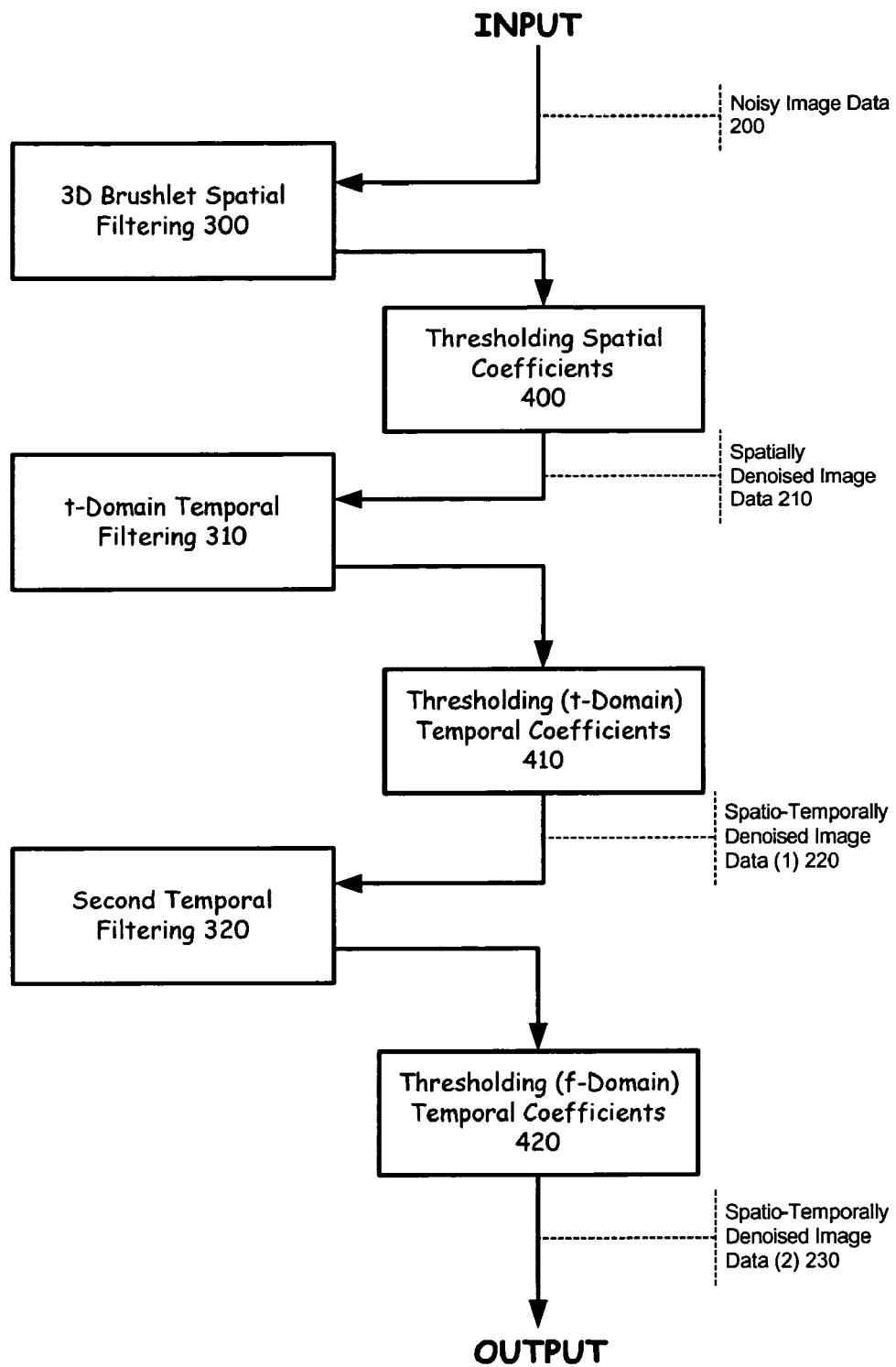
FIG. 12 illustrates a flow chart for treating noisy image data according to one or more embodiments of the invention.

FIG. 12 illustrates an exemplary process for treating noisy image data according to some embodiments disclosed above. Noisy image data 200 is provided as an input to a 3D brushlet filtering process 300 carried out in the frequency domain. A spatial thresholding 400 of the spatial coefficients associated with the spatial brushlet filtering step 300 is performed to obtain spatially-denoised image data 210. The spatially-denoised image data 210 is filtered in the time-domain in a first temporal filter process 310, and then the time-domain filter coefficients are thresholded at step 410 to obtain spatio-temporally denoised image data(1) 220. Another temporal filter 320 in the frequency domain is applied to the spatio-temporally denoised image data (1) 220 and then the temporal (f-domain) coefficients are thresholded at step 420 to provide an output spatio-temporally denoised image data (2) 230.

The denoising processes given above may provide an optimal sequence of steps for "cleaning up" multi-dimensional ultrasound image data and removing or reducing the effects of noise such as speckle noise.

The result of the denoising processes is a spatio-temporally denoised image 222 that is suitable for output to a monitor, clinical worker, or other person or device to make a diagnosis or treatment decision based thereon. Certain advantages of denoised image data were provided herein, and apply to the results of the process shown in FIG. 12. It should be appreciated that the thresholding process 400 can be provided following the denoising steps in alternate ways. For example, a separate and dissimilar thresholding process may be applied following one or more of the denoising steps such that, e.g., one thresholding process 400A includes a hard thresholding operation, while a second thresholding process 400B includes a minimax thresholding operation, etc.

The present disclosure provides a method of dynamic analysis for RT3D imaging technology, e.g. ultrasound, that provides cardiologists with a portable, low cost, easy to administer and non-invasive diagnostic instrument. The design of such analysis tools for 3D ultrasound is useful since other existing 3D protocols available for dynamic cardiac screening, including high-speed CT, phase contrast MRI, and tagged MRI, lack the flexibility and the ease of acquisition offered by ultrasound. A dynamic analysis tool designed according to embodiments of the invention provides: a spatio-temporal denoising method tailored to the nature of the RT3D signals, which enabled 2D and 3D deformable-model segmentation for extraction of ventricular contours; and cardiac function quantification related to clinical diagnosis of heart disease via ventricular volumes and ejection fraction.

Random ultrasound signals acquired through a tank of water are reasonably modeled with a Rayleigh distribution. A model was then developed for echo signals acquired with RT3D ultrasound as the sum of a coherent stationary process and additive correlated Rayleigh noise component. This model can be used to estimate the time and space dependent noise variance, and was included in the denoising procedure.

A spatio-temporal analysis method, tailored to the nature of RT3D ultrasound system, was developed for speckle noise removal and anatomical feature enhancement. The method was used in multidimensional spatio-temporal analysis, i.e., brushlet analysis functions to efficiently perform oriented harmonic denoising and feature enhancement. It was shown that brushlet analysis is well adapted to the intrinsic nature of RT3D ultrasound data and performed better than traditional Wiener denoising methods optimized for ultrasound noise. It was also shown that by including the time dimension directly in the analysis it is possible to exploit the temporal coherence between successive frames and improve feature enhancement, while removing speckle noise components not correlated in time. Denoising via brushlet analysis was performed in three domains: spatial frequency, temporal frequency, and time domains. Each domain analysis employed brushlet functions to accomplish harmonic analysis with different properties that identify different characteristics of the imaging signal. These harmonic properties were derived from the textural aspect of, e.g., the myocardium wall in space and the oscillating movement of the myocardium borders in time.

Empirical and mathematical methods are thus provided to optimize the brushlet denoising procedure. Combined methods identified a set of 'best' parameters and 'best' analysis sequence for brushlet denoising via thresholding. The 'best' (or generally favorable) denoising procedure was defined as a procedure that achieved improvement of image quality, SNR measures, correction of spatial and temporal artifacts, and enhancements of cardiac features suited for segmentation.

Overall, denoised RT3D ultrasound data exhibited good contrast, without artifacts, with homogeneous myocardial texture, and improved the definition of myocardium borders at the epicardial and endocardial walls. These improvements are useful for robust segmentation of the data either manually or with automatic methods. Using manual tracing, a notable improvement in accuracy and intra observer variability was found when using denoised RT3D data rather than original RT3D data for quantification of ventricular volume and ejection fraction.

A deformable model segmentation algorithm in 2D and 3D was developed. The 2D deformable model was derived from the balloon method regulated by a combination of edge-based external forces and internal regularizing forces. The three-dimensional method was derived from a Mumford-Shah minimization method, deforming a surface to achieve an optimal partitioning of the data into smooth regions. Implementation of the two-dimensional segmentation method was performed with parametric representation, while the three-dimensional methods used the level-set framework. These deformable models proved to be suited for segmentation of RT3D ultrasound as they extracted highly curved volumes, while providing smoothness to handle missing myocardium signals and inside localized echo signals from trabeculations.

Several studies were performed on the validation of volume quantification using RT3D ultrasound. One experiment used a static phantom comprising a balloon filled with human albumin and immersed in a tank of water. A second experiment included LV studies from a set of six normal patients, whose ED and ES RT3D ultrasound data was segmented by both a cardiologist and the 2D deformable model. These patients were also screened with MRI. A third clinical study focused on ten PH patients for RV and LV volume quantification Experiments on clinical RT3D data have shown that it is possible to extract LV and RV contours using 2D and 3D deformable-models and quantify volumes of interest with a higher degree of accuracy than those achieved with manual tracing. Temporal averaging takes advantage of spatial coherence in time to better image moving structures. This eliminates temporally non-coherent noise from the image. Applications include imaging of moving cardiac structures, such as mitral valves and myocardium walls.

Upon review of the present description, figures, and specific exemplary embodiments, it will be understood that modifications and equivalent substitutions may be performed in carrying out the invention without departing from the essence of the invention. Thus, the invention is not meant to be limited by the embodiments described explicitly above, rather it should be construed by the scope of the claims that follow.

The invention claimed is:

1. A method for producing denoised multi-dimensional spatio-temporal image data comprising a plurality of multi-dimensional frames taken at different times, the method comprising:
    performing multi-dimensional, spatial brushlet filtering, in the frequency domain, of the plurality of multi-dimensional frames to generate a set of spatial brushlet coefficients;
    thresholding the set of spatial brushlet coefficients to produce a set of spatially-denoised image data corresponding to the multi-dimensional spatio-temporal image data;
    performing a first temporal brushlet filtering, in the time domain, of the spatially-denoised spatio-temporal image data to generate a first set of temporal brushlet coefficients;
    thresholding the first set of temporal brushlet coefficients to produce a first set of spatio-temporally denoised image data corresponding to the multi-dimensional spatio-temporal image data;
    performing a second temporal brushlet filtering, in the frequency domain, of the first set of spatio-temporally denoised image data to generate a second set of temporal brushlet coefficients;
    thresholding the second set of temporal brushlet coefficients to produce a second set of spatio-temporally denoised image data corresponding to the multi-dimensional spatio-temporal image data; and
    outputting the second set of spatio-temporally denoised image data; wherein the above said filtering steps are performed using a computer system.

2. The method of claim 1, wherein the multi-dimensional spatio-temporal image data comprises three-dimensional spatio-temporal image data comprising two-dimensional frames taken at different instants in time.

3. The method of claim 1, wherein the multi-dimensional spatio-temporal image data comprises four-dimensional spatio-temporal image data comprising three-dimensional frames taken at different instants in time.

4. The method of claim 1, wherein producing denoised image data comprises removing speckle noise out of the image data.

5. The method of claim 1, wherein producing denoised image data comprises denoising noisy ultrasound image data.

6. The method of claim 1, wherein any of the thresholding steps comprises performing a hard thresholding operation on the respective coefficients.

7. The method of claim 1, wherein any of the thresholding steps comprises performing a Minimax thresholding operation on the respective coefficients.

8. The method of claim 1, further comprising segmentation of an image feature following denoising of the image data.

9. A computer-readable storage medium storing computer-executable instructions that, when executed by a processor, cause the processor to perform a method for producing denoised multi-dimensional spatio-temporal image data comprising a plurality of multi-dimensional frames taken at different times, the method comprising:
    performing multi-dimensional, spatial brushlet filtering, in the frequency domain, of the plurality of multi-dimensional frames to generate a set of spatial brushlet coefficients;
    thresholding the set of spatial brushlet coefficients to produce a set of spatially-denoised image data corresponding to the multi-dimensional spatio-temporal image data;
    performing a first temporal brushlet filtering, in the time domain, of the spatially-denoised spatio-temporal image data to generate a first set of temporal brushlet coefficients;
    thresholding the first set of temporal brushlet coefficients to produce a first set of spatio-temporally denoised image data corresponding to the multi-dimensional spatio-temporal image data;
    performing a second temporal brushlet filtering, in the frequency domain, of the first set of spatio-temporally denoised image data to generate a second set of temporal brushlet coefficients;
    thresholding the second set of temporal brushlet coefficients to produce a second set of spatio-temporally denoised image data corresponding to the multi-dimensional spatio-temporal image data; and
    outputting the second set of spatio-temporally denoised image data.

10. The computer-readable medium of claim 9, wherein the multi-dimensional spatio-temporal image data comprises three-dimensional spatio-temporal image data comprising two-dimensional frames taken at different instants in time.

11. The computer-readable medium of claim 9, wherein the multi-dimensional spatio-temporal image data comprises four-dimensional spatio-temporal image data comprising three-dimensional frames taken at different instants in time.

12. The computer-readable medium of claim 9, wherein producing denoised image data comprises removing speckle noise out of the image data.

13. The computer-readable medium of claim 9, wherein producing denoised image data comprises denoising noisy ultrasound image data.

14. The computer-readable medium of claim 9, wherein any of the thresholding steps of the method comprises performing a hard thresholding operation on the respective coefficients.

15. The computer-readable medium of claim 9, wherein any of the thresholding steps of the method comprises performing a Minimax thresholding operation on the respective coefficients.

16. The computer-readable medium of claim 9, wherein the method further comprises segmentation of an image feature following denoising of the image data.

* * * * *